(12) United States Patent
Diamond

(10) Patent No.: US 12,630,029 B2
(45) Date of Patent: May 19, 2026

(54) CHARGING ROAD

(71) Applicant: Richard Diamond, Short Hills, NJ (US)

(72) Inventor: Richard Diamond, Short Hills, NJ (US)

( * ) Notice: Subject to any disclaimer, the term of this patent is extended or adjusted under 35 U.S.C. 154(b) by 758 days.

(21) Appl. No.: 17/895,548

(22) Filed: Aug. 25, 2022

(65) Prior Publication Data

US 2023/0068912 A1 Mar. 2, 2023

Related U.S. Application Data

(60) Provisional application No. 63/237,021, filed on Aug. 25, 2021.

(51) Int. Cl.
| | |
|---|---|
| B60L 53/12 | (2019.01) |
| B60L 5/00 | (2006.01) |
| B60M 7/00 | (2006.01) |
| H02J 50/00 | (2016.01) |
| H02J 50/10 | (2016.01) |

(52) U.S. Cl.
CPC ............... B60L 53/12 (2019.02); B60L 5/005 (2013.01); B60M 7/003 (2013.01); H02J 50/005 (2020.01); H02J 50/10 (2016.02)

(58) Field of Classification Search
CPC .......... B60L 53/12; B60L 53/32; B60L 5/005; H02J 50/005; H02J 50/10; B60M 7/003
See application file for complete search history.

(56) References Cited

U.S. PATENT DOCUMENTS

| | | | |
|---|---|---|---|
| 8,439,597 B2 | 5/2013 | Diamond | |
| 9,394,650 B2 | 7/2016 | Diamond | |
| 10,513,190 B2 | 12/2019 | Huang et al. | |
| 11,031,826 B2 | 6/2021 | Boys et al. | |
| 11,040,630 B2 | 6/2021 | Diamond | |
| 2013/0020866 A1* | 1/2013 | Asplund | B60L 5/40 |
| | | | 307/9.1 |
| 2013/0229061 A1 | 9/2013 | Budhia et al. | |

(Continued)

FOREIGN PATENT DOCUMENTS

| | | | | |
|---|---|---|---|---|
| DE | 102007026252 A1 * | 12/2008 | | B60L 5/005 |
| EP | 3353008 B1 | 7/2021 | | |
| JP | 2010288394 A * | 12/2010 | | B60L 53/126 |

(Continued)

OTHER PUBLICATIONS

DE-102007026252-A1 machine translation. (Year: 2025).*

(Continued)

*Primary Examiner* — David V Henze
(74) *Attorney, Agent, or Firm* — Nixon & Vanderhye P.C.

(57) ABSTRACT

Magnetic or electromagnetic field generators are disposed on, near or toward opposite sides of a roadway, carriageway or lane such that magnetic or electromagnetic lines of force across at least a portion of the roadway, carriageway or lane. A vehicle traveling down the roadway, carriageway or lane interacts with the magnetic or electromagnetic lines of force to absorb energy that can be used for battery recharging or other purposes. Magnetic or electromagnetic flux density can be increased by embedding magnetic materials or additional structures in the top paving course forming the roadway, carriageway or lane.

20 Claims, 29 Drawing Sheets

(56) References Cited

U.S. PATENT DOCUMENTS

2021/0081624 A1    3/2021    Kovarik et al.

FOREIGN PATENT DOCUMENTS

| | | | |
|---|---|---|---|
| JP | 6841760 | B2 | 3/2021 |
| KR | 10-2011-0041173 | A | 4/2011 |
| KR | 20110041173 | A * | 4/2011 |
| WO | 2011037434 | A2 | 3/2011 |

OTHER PUBLICATIONS

JP-2010288394-A machine translation. (Year: 2025).*
International Search Report and Written Opinion issued in PCT Application No. PCT/US2022/041499 dated Dec. 2, 2022.
Purcell et al., "Electricity and Magnetism" (Cambridge University Press 3d Ed, 2013).
Coey, "Magnetism and Magnetic Materials" (Cambridge University Press 2010).
Staelin, "Electromagnetics and Applications", MIT Course No. 6.013, https://ocw.mit.edu/courses/6-013-electromagnetics-and-applications-spring-2009/, (Spring 2009).
Wangsness, "Electromagnetic Fields", https://www.scribd.com/document/364776824/Roald-K-Wangsness-Electromagnetic-Fields-pdf (Wiley 2d Ed. 2007).
Huber, "Asphalt's miraculous cure", https://www.empa.ch/web/s604/asphalt-healing, Apr. 21, 2016.
"Shielding Materials", K&J Magnetics, https://www.kjmagnetics.com/blog.asp?p=shielding-materials, 2022.
"Mu-metal", Wikipedia, https://en.wikipedia.org/wiki/Mu-metal#:~:text=4%20Similar%20materials-,Magnetic%20shielding,or%20slowly%20varying%20magnetic%20fields, 2022.
Provisional Patent Application for Wireless Charging and Autonomous Vehicle Control—U.S. Appl. No. 63/219,482, filed Jul. 8, 2021.
SAE J2954 (Society of Automotive Engineers), 2020.
SAE J2954 (Society of Automotive Engineers), 2022.

* cited by examiner

CHARGING ROAD

CROSS-REFERENCE TO RELATED APPLICATIONS

The present application claims the benefit of U.S. Provisional Patent Application No. 63/237,021, filed Aug. 25, 2021, which is incorporated herein by reference in its entirety and for all purposes.

This application is related to the following patents and patent applications each of which is incorporated herein by reference for all purposes as if expressly set forth herein: U.S. Pat. No. 11,040,630 entitled "Wireless road charging system" and U.S. provisional patent application No. 63/219, 482 filed 8 Jul. 2021 entitled Wireless Road Charging And Autonomous Vehicle Systems.

FIELD

The technology herein relates to vehicle charging systems, and more particularly to roadways that charge vehicles.

BACKGROUND & SUMMARY

A major factor impeding the commercialization of electric vehicles is the relative scarcity of plug-in type charging stations and the relatively long charging times. A promising alternative to plug-in charging is wireless charging using magnetic field generators embedded in a roadway to couple wirelessly with induction wires or other pickup devices in a moving vehicle so as to charge the vehicle battery. But there are problems with the wireless charging road systems that have been proposed to date.

Currently proposed systems involve burying the magnetic field generators under the top course paving of the roadway. Compacted asphalt does not readily propagate magnetic fields, and road paving may be several feet thick, thereby limiting the inductive potential of the system. Similar type impediments are presented where the magnetic field generators are embedded in concrete roadways, since concrete does not readily propagate magnetic fields and embedding the magnetic field generators in the concrete impacts the inductive potential of the system. There are also problems with proper registration between vehicles travelling down a roadway and magnetic field generators embedded within the roadway. For example, vehicles may change lanes and even when staying in the same lane may be positioned at different lateral points in the lane depending on the driver, the vehicle, road conditions, traffic and other factors. Consequently, there remains the need for a wireless road charging system that enables placement of the magnetic field generators near the surface of the roadway in an environment that is protected from moisture, paving compaction forces and the weight of vehicles and which works efficiently with vehicles exhibiting different positions relative to the roadway.

Various experimental wireless charging methods use magnetic resonance inductive coupling based on oscillating magnetic fields. But power losses of such systems increase rapidly with the air gap between the transmitter and receiver resonators. Furthermore, resonant inductive coupling may work best between stationary resonators, so that the velocity of the vehicle along the charging road lane becomes a problem rather than an advantage.

There is a long felt but unsolved need for a practical charging road that can charge a vehicle as it travels down a roadway.

DETAILED DESCRIPTION OF NON-LIMITING EMBODIMENTS

Figure 1:
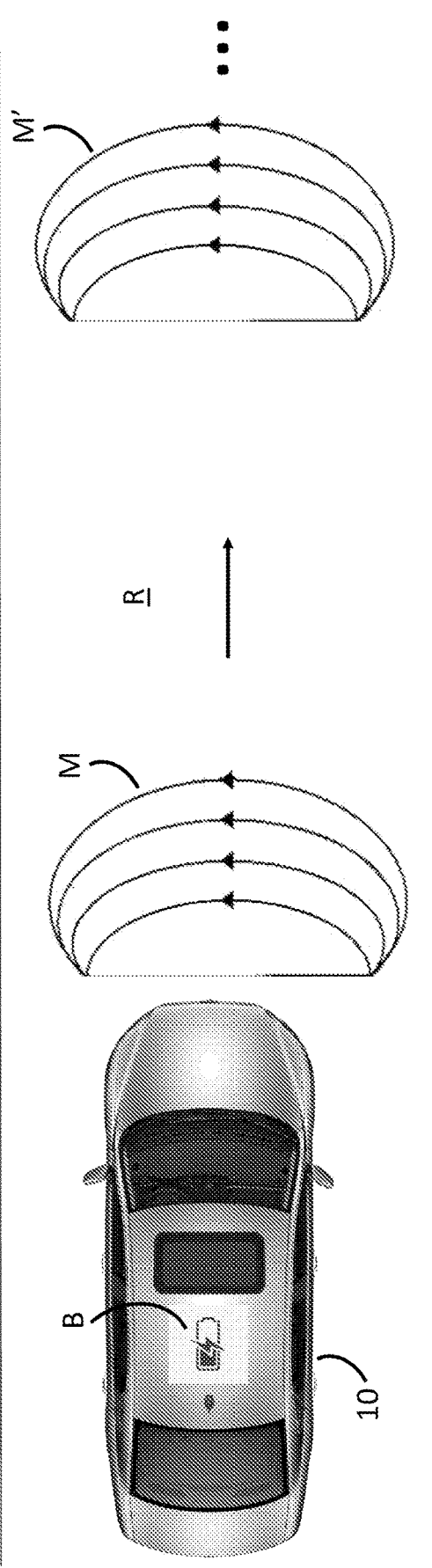
FIG. 1 shows an overall diagram of a charging road interacting with a vehicle.

FIG. 1 shows an example vehicle 10 traveling down a charging roadway R. Vehicle 10 can be a passenger car, a motorcycle, a motor scooter, a passenger truck, a tractor-trailer, any other type of car or truck, a military vehicle, an emergency vehicle, or any other type of vehicle. The roadway R is structured and configured to emanate magnetic or electromagnetic fields M that at least partially and sometimes completely span across the carriageway the roadway defines.

As the vehicle 10 travels down the roadway, it passes through these magnetic or electromagnetic fields M. The vehicle 10 includes structure that produces electric current in response to the vehicle 10 being proximate to and/or passing through these magnetic or electromagnetic fields M the roadway R emanates. The vehicle 10 uses this produced electric current to partially or fully charge or recharge a battery B on board the vehicle.

As FIG. 1 shows, the roadway R may be structured to emanate multiple magnetic or electromagnetic field hotspots or lobes spaced axially at spacings or intervals along the roadway. The spacings between hotspots or lobes can be close together or far apart. Thus, vehicle 10 passes through a sequence or series of magnetic or electromagnetic field hotpots or lobes M as it travels longitudinally down the roadway R along the axis (see FIG. 1 arrow) of the roadway. Each time the vehicle 10 passes through a magnetic or electromagnetic field hotspot or lobe M, the vehicle receives magnetic and/or electromagnetic waves and produces an electric current that charges its battery B and/or supplies operating power for the vehicle to reduce the vehicle's need to further discharge its battery. In one embodiment, the magnetic or electromagnetic fields M are structured and spaced such that roadway R preferably charges or recharges battery B at a rate that exceeds the rate at which the vehicle 10 discharges the battery during driving. In other embodiments, the magnetic or electromagnetic fields M are structured and spaced such that the electrical current the vehicle 10 generates based on interaction with roadway R reduces the rate at which the vehicle discharges its battery B. Such charging or recharging can be aided or supplemented by other charging systems on board the vehicle such as solar panels on the vehicle roof or other surfaces, wind powered generators, regenerative braking systems, and the like. Thus, in one embodiment the vehicle 10 can continue driving down the roadway R indefinitely without having to stop to recharge its battery B. In other embodiments, the range of the vehicle before the vehicle needs to stop for a battery recharge is increased by some amount such as more than 10%, more than 20%, more than 25%, more than 50%, more than 75%, more than 90%, more than 100%, more than 200%, more than 300%, more than 400%, more than 500%, or more than some other percentage or amount.

Because the magnetic or electromagnetic fields M at least partially or fully span across the carriageway of the roadway R, the vehicle 10 will pass through the magnetic or electromagnetic fields M as it travels axially down the roadway irrespective of which part or side of the carriageway the vehicle travels on. For example, in the United States Interstate Highway System, the standard roadway lane width is 12 ft (3.7 m). Lane widths of 10 feet are often used for urban areas. The carriageway of roadway R may have a single lane or multiple lanes separated by lane markings. In the case of multiple lanes, the carriageway may have one lane per direction of vehicle travel or multiple lanes per direction of vehicle travel. In some embodiments, the magnetic or electromagnetic fields M span across multiple such lanes so that vehicle 10 will pass through the magnetic or electromagnetic fields M no matter which lane it travels within, whether it is between lanes (e.g., such as a motorcycle on certain roadways), and which direction it is travelling down the roadway. In other embodiments, the magnetic or electromagnetic fields M span across a single lane or a part of a single lane such that only a vehicle 10 driving down the single lane will pass through the magnetic or electromagnetic fields M. Although the magnetic or electromagnetic fields M are shown as spanning across the lane or carriageway in a direction perpendicular to the roadway R direction, the magnetic or electromagnetic fields could cross the carriageway at an angle relative to the roadway direction such as 10 degrees, 20 degrees, 30 degrees, 45 degrees, 60 degrees, 75 degrees, etc. or any angle less than 90 degrees.

Figure 2:
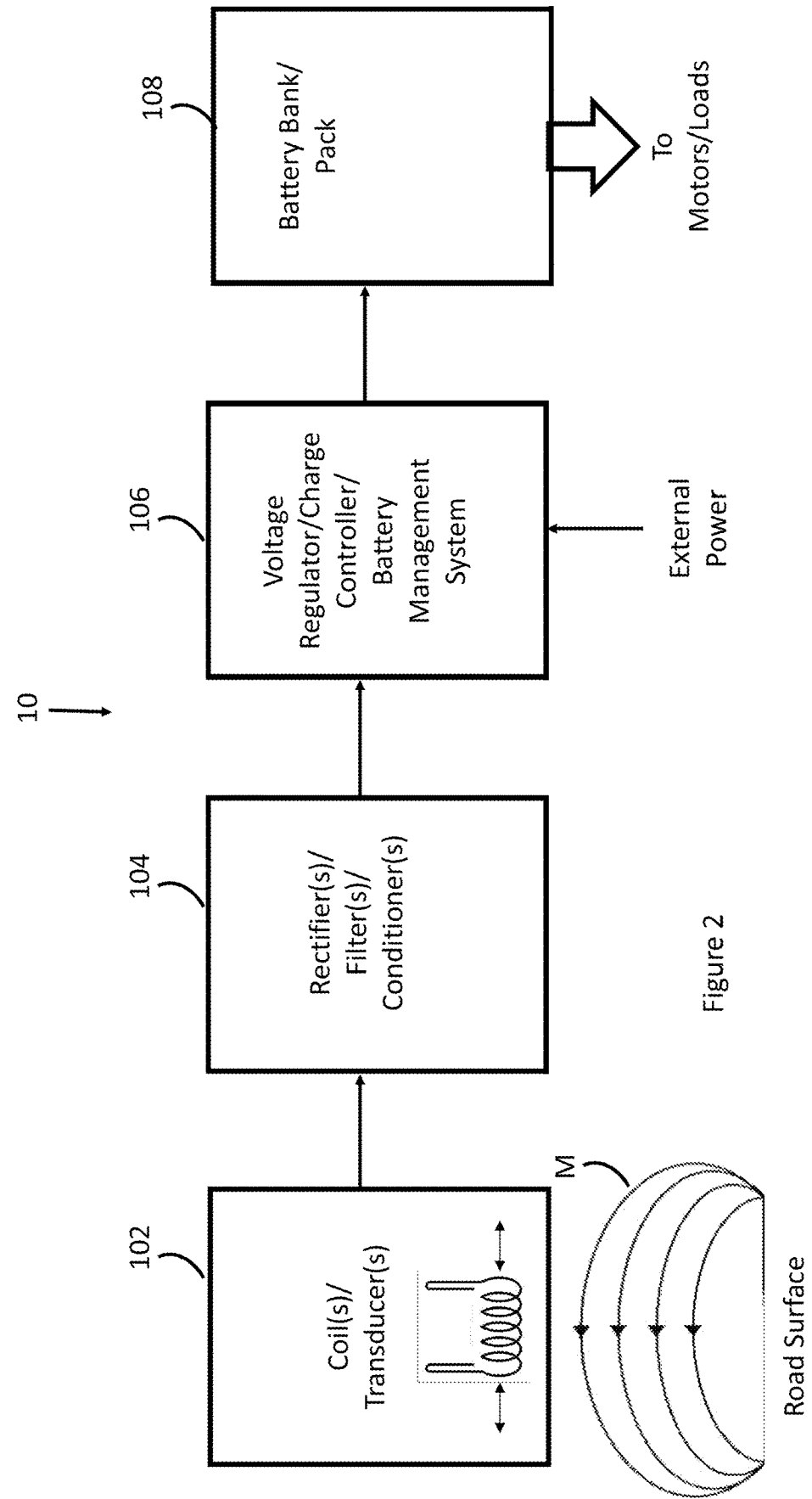
FIG. 2 shows a vehicle block diagram.

FIG. 2 is a schematic block diagram of vehicle 10 designed to interact with charging roadway R. The vehicle 10 includes magnetic or electromagnetic coils, transducers or other pickups 102 that interact with the magnetic or electromagnetic fields M produced by the roadway R to produce an electric current. Depending on the type(s) of magnetic or electromagnetic fields M the roadway R produces, the vehicle 10 may include a block 104 that rectifies, filters and/or otherwise conditions, converts or transforms the electric current picked up or produced by the coils, transducers or other pickups 102 in response to the magnetic or electromagnetic fields M. The output of block 104 is typically a direct current (DC) that is supplied to a voltage regulator/charge controller 106. The voltage regulator/charge controller/battery management system 106 uses the direct current produced by block 104 to charge battery B (in this case, a bank or pack of Lithium-ion, lithium-metal or other batteries 108 connected in series and/or parallel). The output of block 104 may for example match the charging voltage required by a battery cell or cells of battery bank or pack 108 such as for example 21 VDC or 12 VDC or 16 VDC or 24 VDC or 6 VDC or 8 VDC or 10 VDC or 2.5 VDC or 3 VDC or any other design voltage.

Figure 3A:
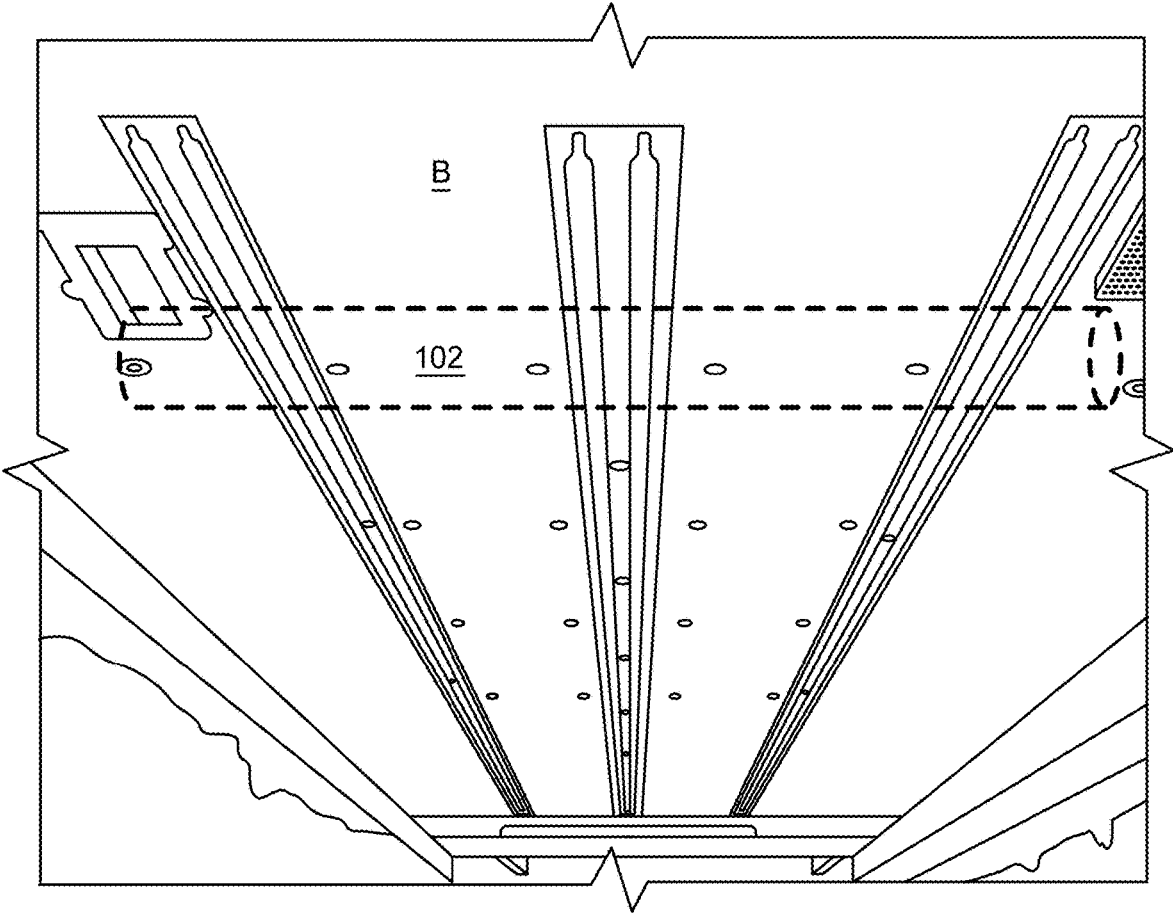
FIGS. 3A-3E show different vehicle transducer configurations.
Figure 3B:
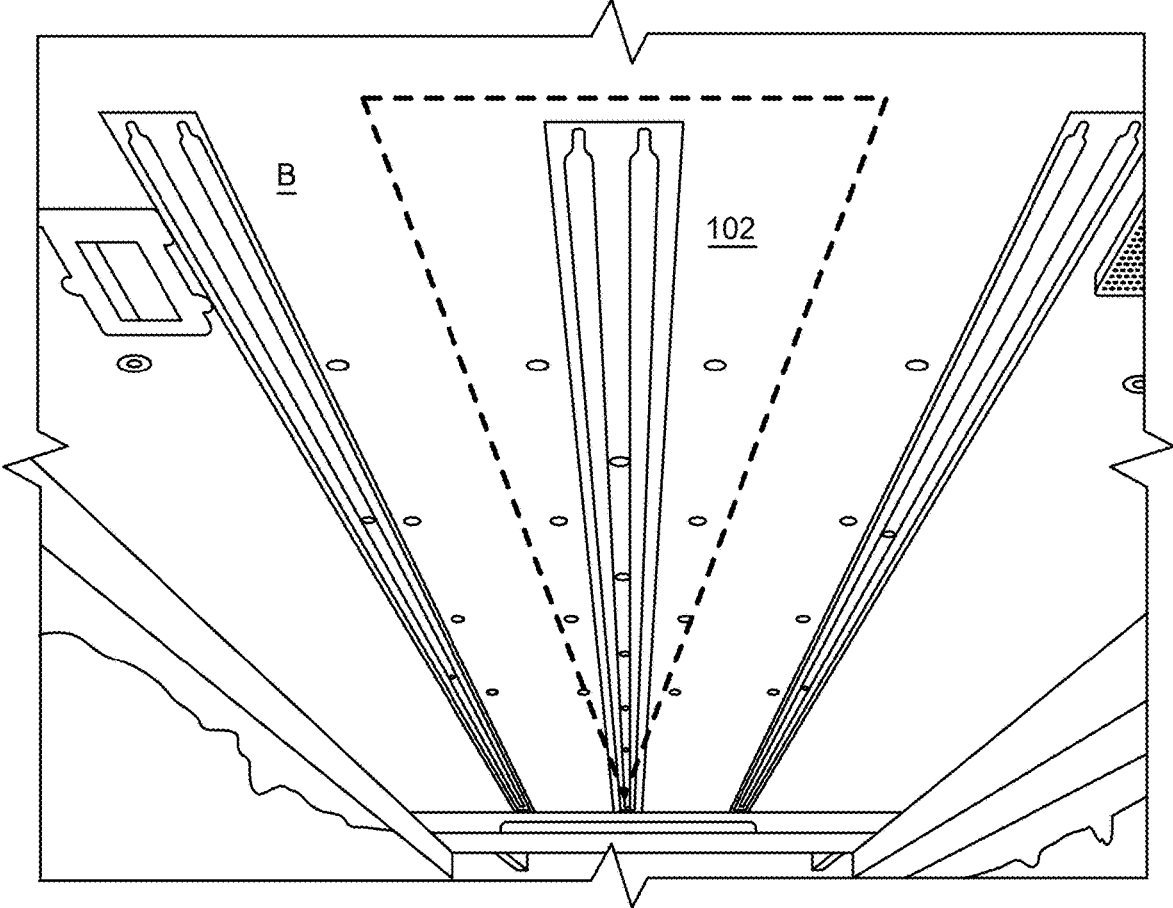
Figure 3C:
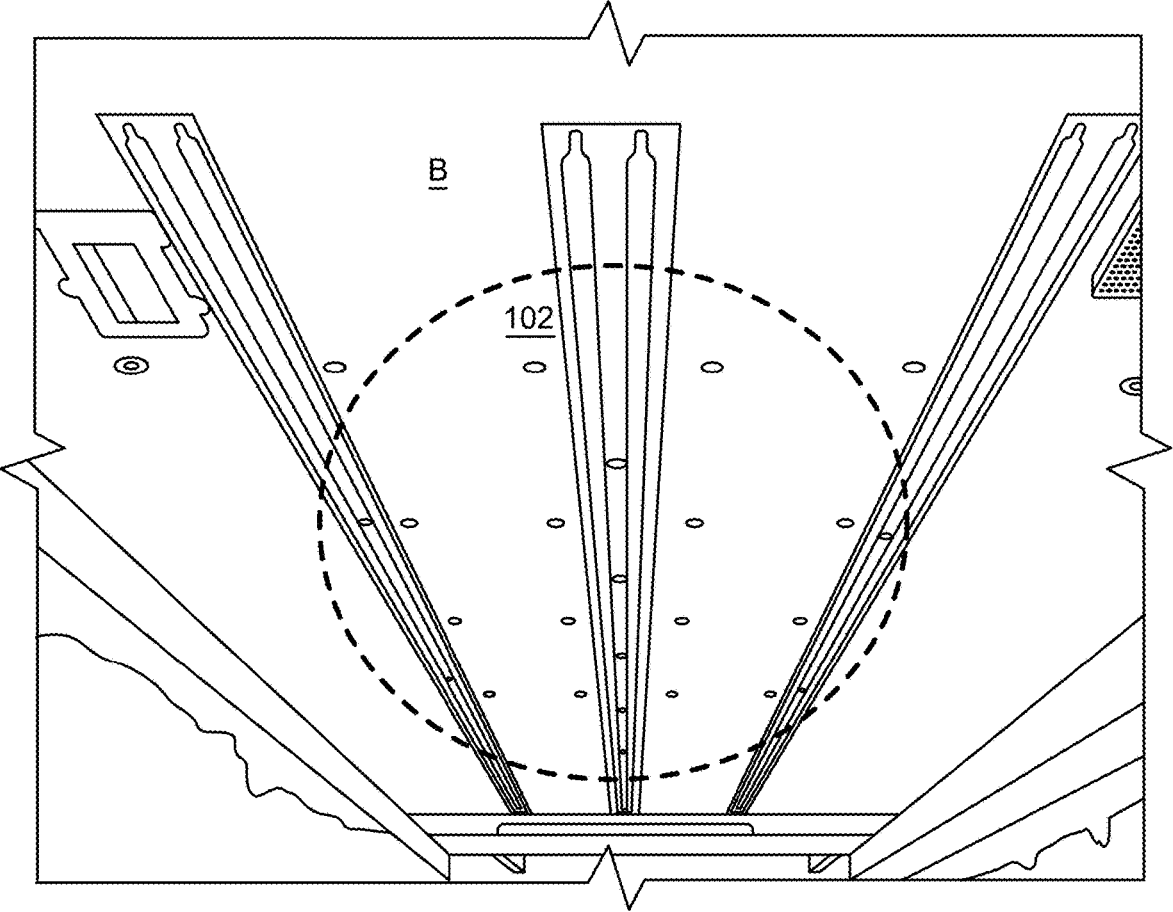
Figure 3D:
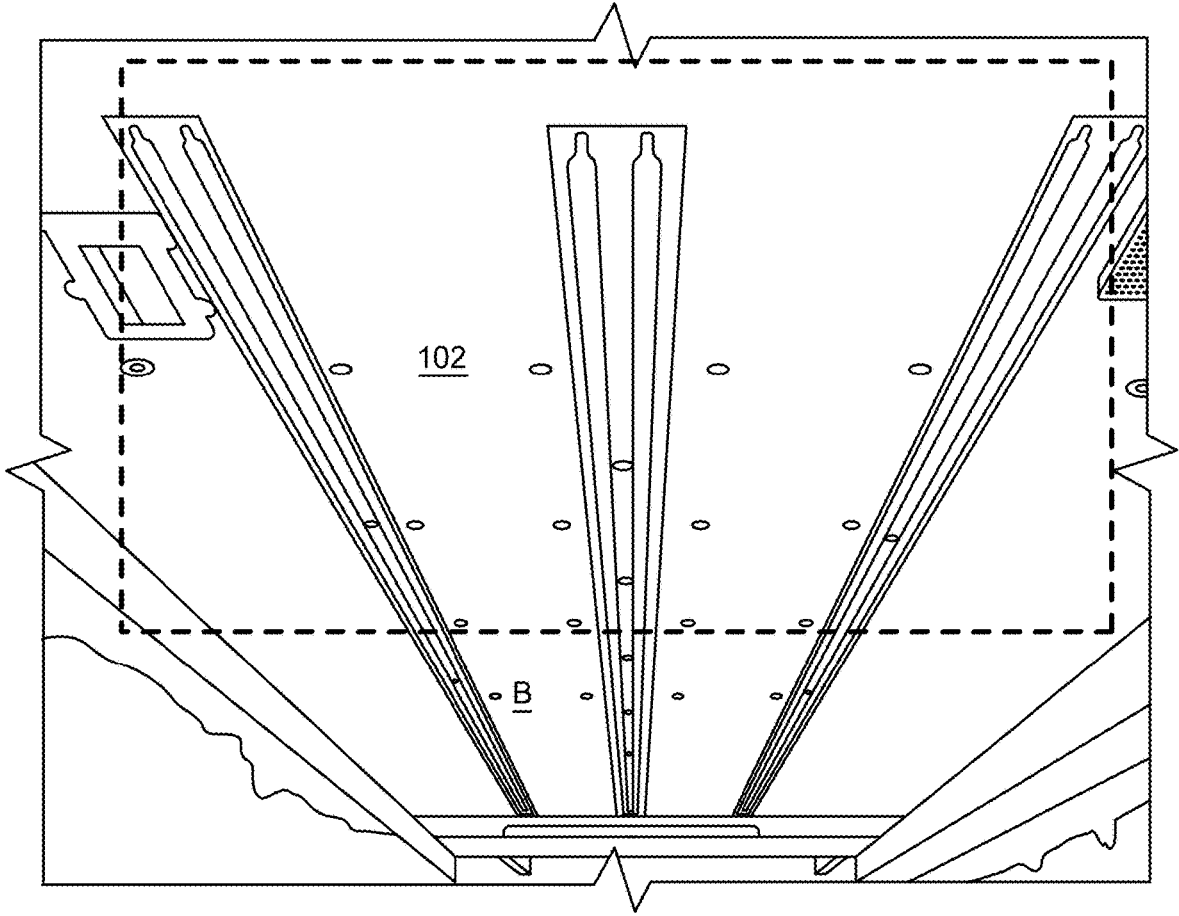

FIGS. 3A-3E show different example configurations for battery pack 108 and charging coils, transducers or other pickups 102. In the examples shown, the battery pack 108 may be a conventional liquid-cooled multi-cell lithium-ion, lithium-metal or other type of battery pack that attaches to the undercarriage or other part of vehicle 10 by conventional means. Because the roadway R provides magnetic or electromagnetic fields M that span at least part or all of the carriageway, the coils, transducers or other pickups 102 can be arranged or distributed across a substantial width portion of the vehicle 10's undercarriage or footprint. For example, FIG. 3A shows a cylindrical magnetic or electromagnetic coil (e.g., solenoid) that spans across a substantial portion of the width of the vehicle 10 undercarriage. FIG. 3B shows another magnetic or electromagnetic coil or other pickup configuration that spans across a substantial portion of the width and the length of the vehicle 10 undercarriage, shaped in this case as a triangular pickup comprising multiple coils or other pickup legs connected in series or parallel. FIG. 3C shows another example magnetic or other pickup coil configuration that spans across a large portion of the vehicle undercarriage or subframe and has a circular configuration with a radius that is a substantial percentage of the roadway R carriageway or lane width. FIG. 3D shows a rectangular coil or other pickup configuration that spans a substantial portion of the width and length of the vehicle undercarriage.

Figure 3E:
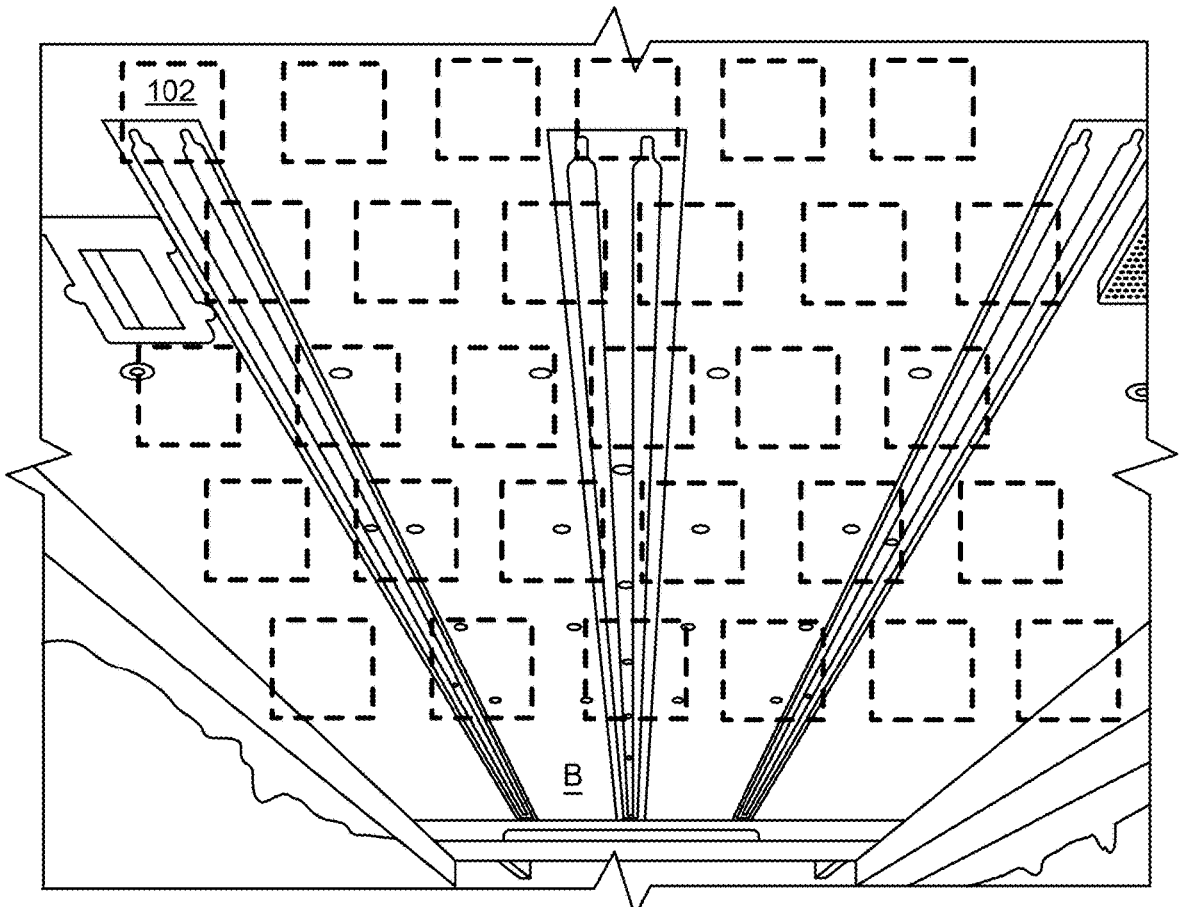

FIG. 3E shows an example distributed arrangement comprising a number (in this case 30 but any number could be used) of different coils, transducers or other pickups of any shape and size. The coils, transducers or other pickups are distributed across the length and width of the vehicle 10 undercarriage (in one example, the coils, transducers or other pickups could also serve as magnetic or electromagnetic shields for the battery cells within the battery pack 108 or for other components). As the vehicle 10 passes through a magnetic or electromagnetic field M the roadway R emanates, the distributed coils, transducers or other pickups will produce a sequence, series, bursts or maxima of electric currents as they are each exposed to the magnetic or electromagnetic field M in turn. This sequence, series, bursts or maxima of electrical currents can be used to charge, in sequence, corresponding battery cells that are also distributed across the undercarriage of the vehicle 10 or they could be summed to charge all or some subset of plural cells in parallel or concurrently. Thus, in one plural battery cells arranged across the front of the vehicle 10 will receive charging current first, followed by plural battery cells arranged across the vehicle further to the rear of the vehicle, following by plural battery cells arranged across the vehicle near the rear of the vehicle, as the vehicle passes through the magnetic field M. Such a charging "wave" (like the wave in a football stadium) of parallel cell charging actions or events is enabled by the magnetic or electromagnetic field M spanning a substantial portion of the width of the lane or carriageway defined by roadway R.

Figure 4A:
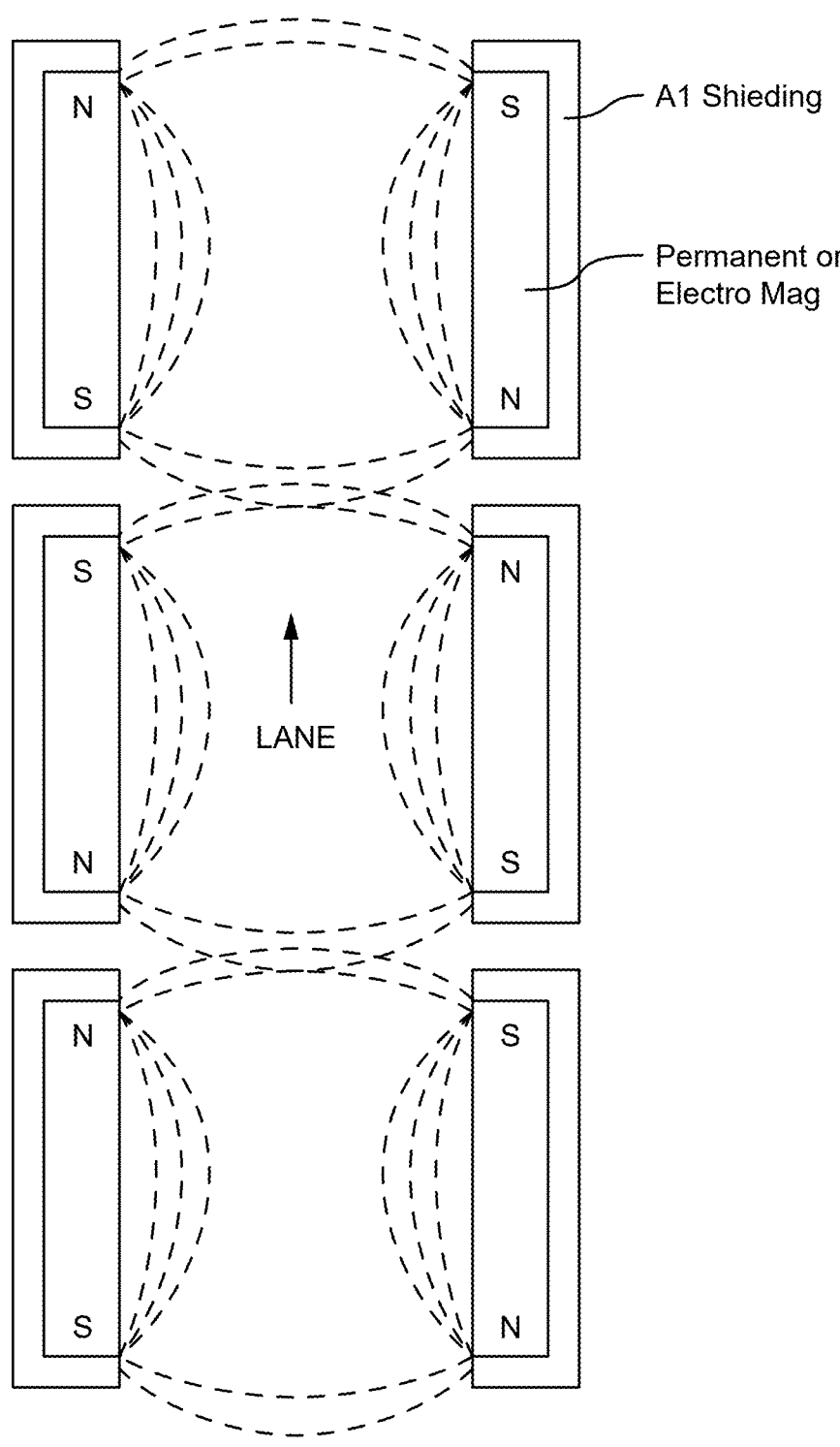
FIGS. 4B and 4C shows an example roadway magnetic or electromagnetic field generator configuration.

FIG. 4A is a plan view sketch of a section of a 10-foot-wide road lane (1 block=1 ft.) with 10-foot magnetic or electromagnetic field generator "rails" or other structures 202 on either side of the lane or carriageway. On either side of the travelled lane, at or near the roadway surface, are a series of magnetic or electromagnetic field generators, forming magnetic or electromagnetic "rails" or other structure(s) in a direction axial to the roadway, which generate magnetic or electromagnetic field lines that laterally traverse the travelled lane width-wise, so that the induction wires/coils or other pickups of the moving vehicle orthogonally cut through or are otherwise exposed to the magnetic or electromagnetic field lines. The electric current thereby induced or produced in the moving vehicle's wires/coils or other pickups is then used in a charging circuit to recharge the vehicle's battery as described above.

The orientation of the magnetic or electromagnetic field generators can either be orthogonal to the road surface or parallel to the road surface or at some angle between orthogonal and parallel such as 10 degrees or 20 degrees or 30 degrees or 40 degrees or 45 degrees or some other angle. The magnetic or electromagnetic field generators 202 can be permanent magnets, electromagnets, electromagnetic emitters or a combination of permanent magnets and/or electromagnets and/or electromagnetic emitters, In one embodiment, they are horizontally oriented parallel to the lane centerline (or tangent to the centerline in a curved lane section). One embodiment includes two parallel rows of permanent magnets or electromagnets affixed to or embedded in the roadway R. However, other embodiments, could include multiple rows of such permanent magnets and/or electromagnets and/or electromagnetic emitters. Each pair of adjacent rows of permanent magnets and/or electromagnets and/or electromagnetic emitters emanate a magnetic or electromagnetic field between them such that multiple adjacent rows can provide an overall magnetic or electromagnetic field that covers some substantial portion of the roadway carriageway without substantial interference. In one particular example, there is a dual rail system with the magnets at the top of the rails flush with the road surface, or the rails are embedded in the asphalt/concrete top course of the roadway R. In other embodiments, the magnets are embedded in a type of rail that does not act to reduce potholes but which anchors to the underlying road material. In other embodiments, the magnets are embedded in a type of 'gasket system" or protective casing that does not act to reduce potholes but which anchors to the underlying road material and which magnets are similarly placed inside the protective casing at or near the surface of the roadway.

Surrounding each magnetic or electromagnetic field generator 202 on three sides and underneath is structure which serves to focus the magnetic flux or electromagnetic energy across the lane. The structure can be of made of various magnetic or non-magnetic materials. The particular choice of material and its thickness and shape may depend on whether the magnetic or electromagnetic fields are static or varying, and if varying, the frequency at which they are varying. The structure may in one embodiment comprise plates which may be flat or wrapped partly around the magnetic or electromagnetic field generators 202. The most effective structure depends on whether the magnetic field is static or varying. While steel will block or redirect the magnetic field, it will also attract and concentrate the field lines within it, which has the effect of diverting the field energy from the direction you want it to go (opposite to the direction of the structure). On the other hand, varying magnetic fields will induce eddy currents in aluminum (or other non-ferromagnetic conductors), which will produce a magnetic field opposite to the inducing field, thereby potentially weakening it by creating destructive interference.

In FIG. 4A, dashed lines in one embodiment represent magnetic field lines, some of which propagate along the longitudinal axis of the magnets, and others of which propagate across the lane to the opposing magnet's pole. The technical problem to be solved is how to maximize the trans-lane magnetic flux. As a first approximation, the total flux should divide proportionately to the respective magnetic permeabilities of the paths along the magnets and across the lanes.

FIG. 4A shows the field lines "jumping" across the roadway. Some magnetic field lines will cross no matter what, but it is desirable to direct as many as possible across the roadway. This will involve making the cross-road path more attractive to conducting or directing the magnetic flux than the longitudinal path back to the opposite pole of the same magnet. As a first approximation, this is determined by the relative magnetic permeabilities of the two paths. Having a stronger magnetic rail on one side as opposed to the other does not in one embodiment affects this, because the opposite pole of that stronger rail will draw the flux more strongly than the pole of the weaker rail across the road.

As a first approximation, the permeability of the path along the magnet is that of the magnetic core material, while the permeability of the path across the lane is that of the lane surface. Therefore, addition of a ferro-magnetic or other field-altering and/or conducting material to the lane top course paving should increase the "usable" portion of the magnetic flux. In one embodiment, there can be bands of higher Fe concentration across the lane at the rail poles. In addition to adding the ferromagnetic other field-altering and/or conducting material to the road surface material, an additional concentration of the material may be added across the lane at the top point of both rails and at the bottom point of both rails to give a stronger field line to help aid in the creation of the loop needed between the two rails. The selection of a ferromagnetic or other field-altering and/or conducting additive to the roadway surface will depend on the concentration needed to achieve the requisite magnetic permeability. Iron filings, being pure Fe, would be stronger than magnetite sand, albeit more expensive. Other materials that can be added to or embedded within the top course paving might, depending on the application, include magnetic microparticles, magnetic nanostructures, magnetizable conductive particles, non-magnetizable conductive particles, ferrite, soft magnetic composite, amorphous iron, permalloy particles or structures, or any combination thereof. Regarding use of ferromagnetic material in the top course paving, in sufficient concentration, it will attract and concentrate the magnetic field lines, similar to the ferromagnetic core of an electromagnet. But, since magnetic field lines always must loop around the core to find their way back to the opposite pole, the field lines will also extend on both sides of the top course paving—that is, both above and below the paving. The "usable" magnetic flux in this scenario can be maximized by placing magnetic material below the top course paving.

Figure 5A:
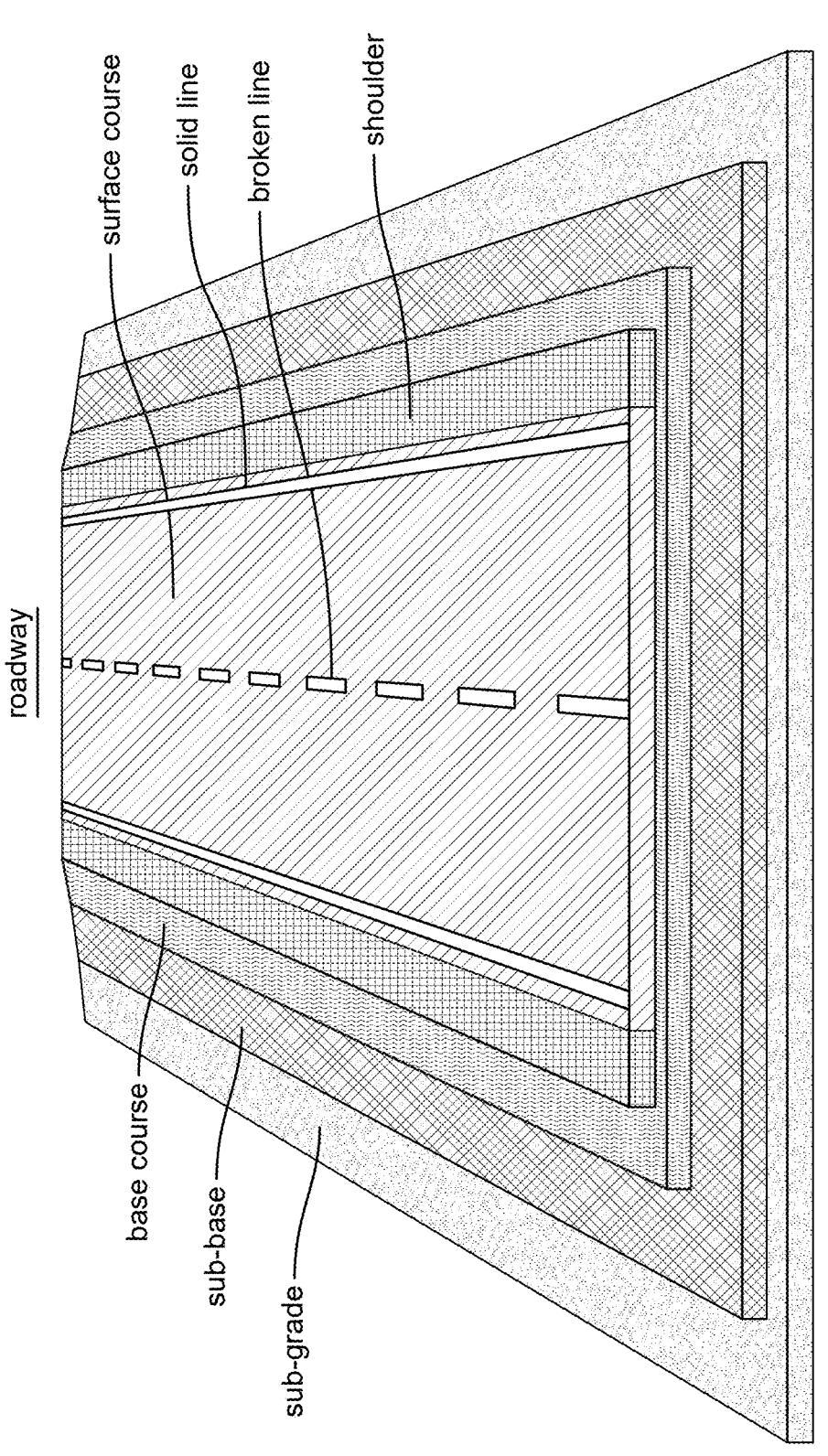
FIGS. 5A-5D show different example road structures.
Figures 5B, 5C:
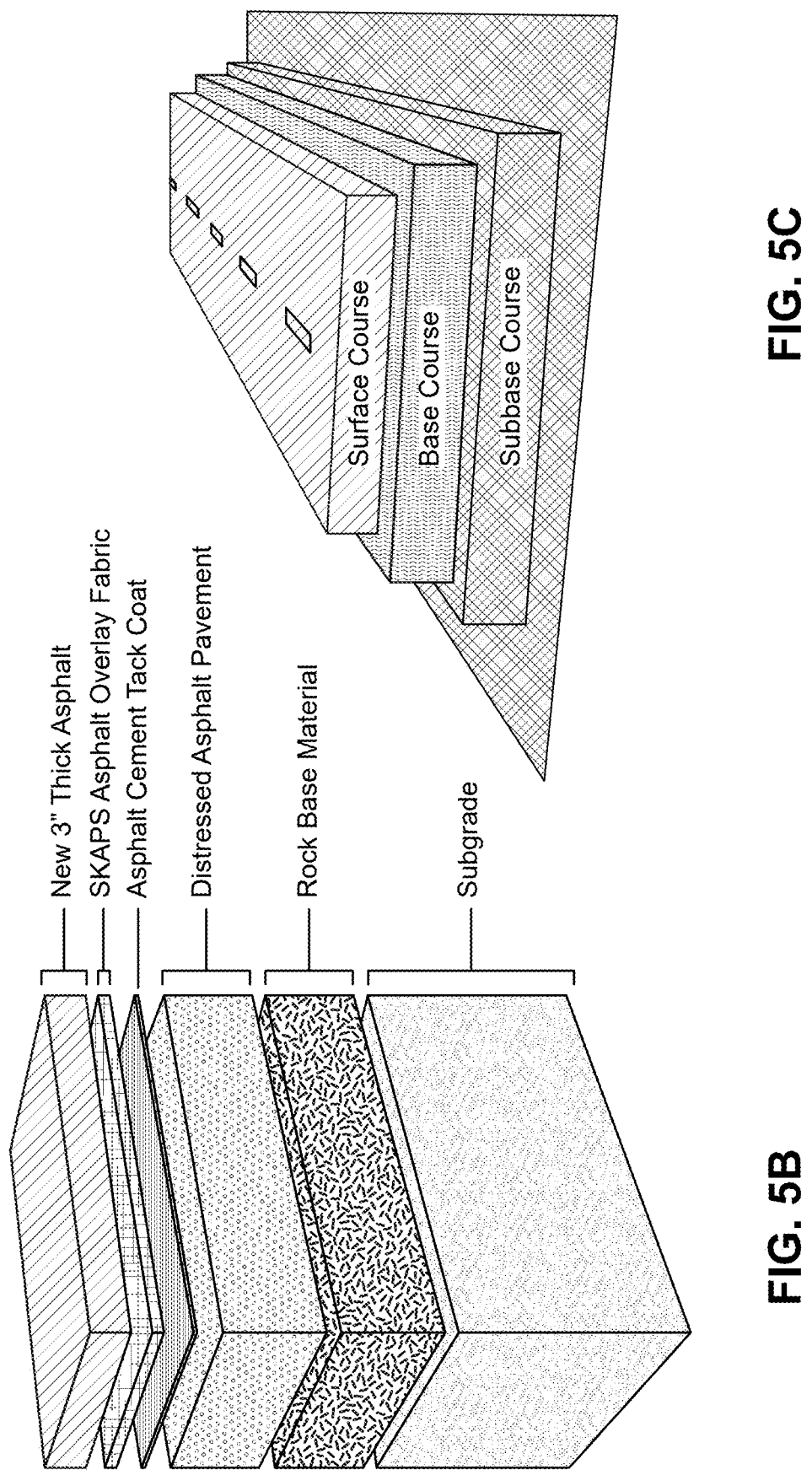
Figure 5D:
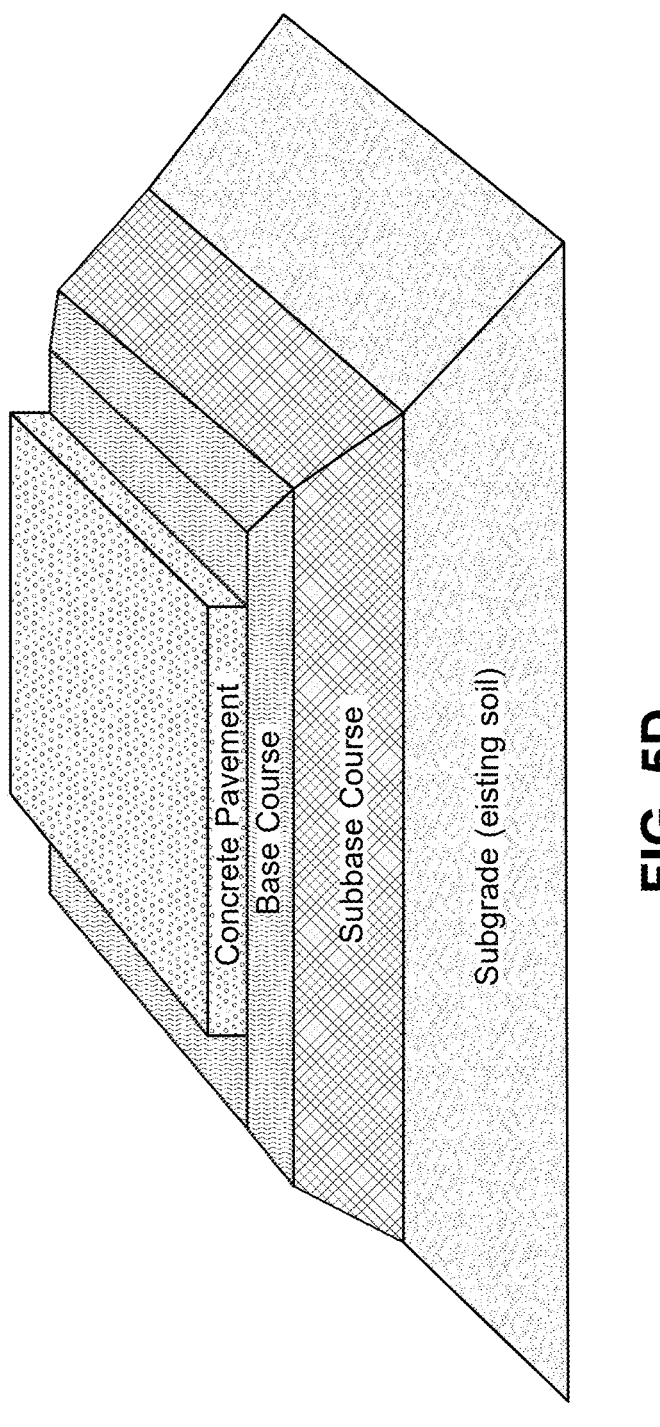

To provide further structural context, FIGS. 5A-5C show an example roadway R structure comprising a subbase course, a base course and a surface course. FIG. 3B shows that the roadway R can be constructed over a subgrade and rock base material, and have a surface course comprising distressed asphalt pavement, an asphalt cement tack coat, an asphalt overlay fabric, and a top surface course of 3" thick asphalt. Ferromagnetic material such as ferromagnetic nanoparticles, iron filings, etc. may be added to any of these layers but in particular to the top surface course of 3" asphalt to increase the usable portion of the magnetic flux. The roadway need not be limited to asphalt however; FIG. 3D shows an example roadway R structure comprising a top surface course of concrete. In such case, the ferromagnetic material may be added to the concrete top course. In the case of concrete roadways that include iron bar underlayment reinforcement, the iron bars may be magnetized or otherwise used to increase the strength of magnetic flux produced by the roadway R. In terms of propagating the magnetic field, installation of the rails or other magnetic field generators as close to road grade as feasible is best, but other factors, including wiring, equipment protection, maintenance, wear, etc. are also to be considered.

In the case the magnetic or electromagnetic field generators are permanent magnets, the magnetic field is static, and the vehicle 10 must be moving across the field lines in order to generate a re-charging current. In the case of the magnetic or electromagnetic field generators are electro-magnets or electromagnetic radiators excited by a varying (e.g., alternating) current, the magnetic or electromagnetic field is varying (e.g., sinusoidally) at a frequency such as 10 Hz or 20 Hz or 40 Hz or 50 Hz or 60 Hz or 80 Hz or 100 Hz or 120 Hz or 150 Hz or 200 Hz, so that current generation continues even when the vehicle is stationary. Configurations which include both permanent magnets and electromagnets are feasible and may be "tuned" to provide an optimal balance between dynamic and stationary charging. That balance may differ depending on roadway traffic volumes and the frequency of vehicle idling.

Figure 6:
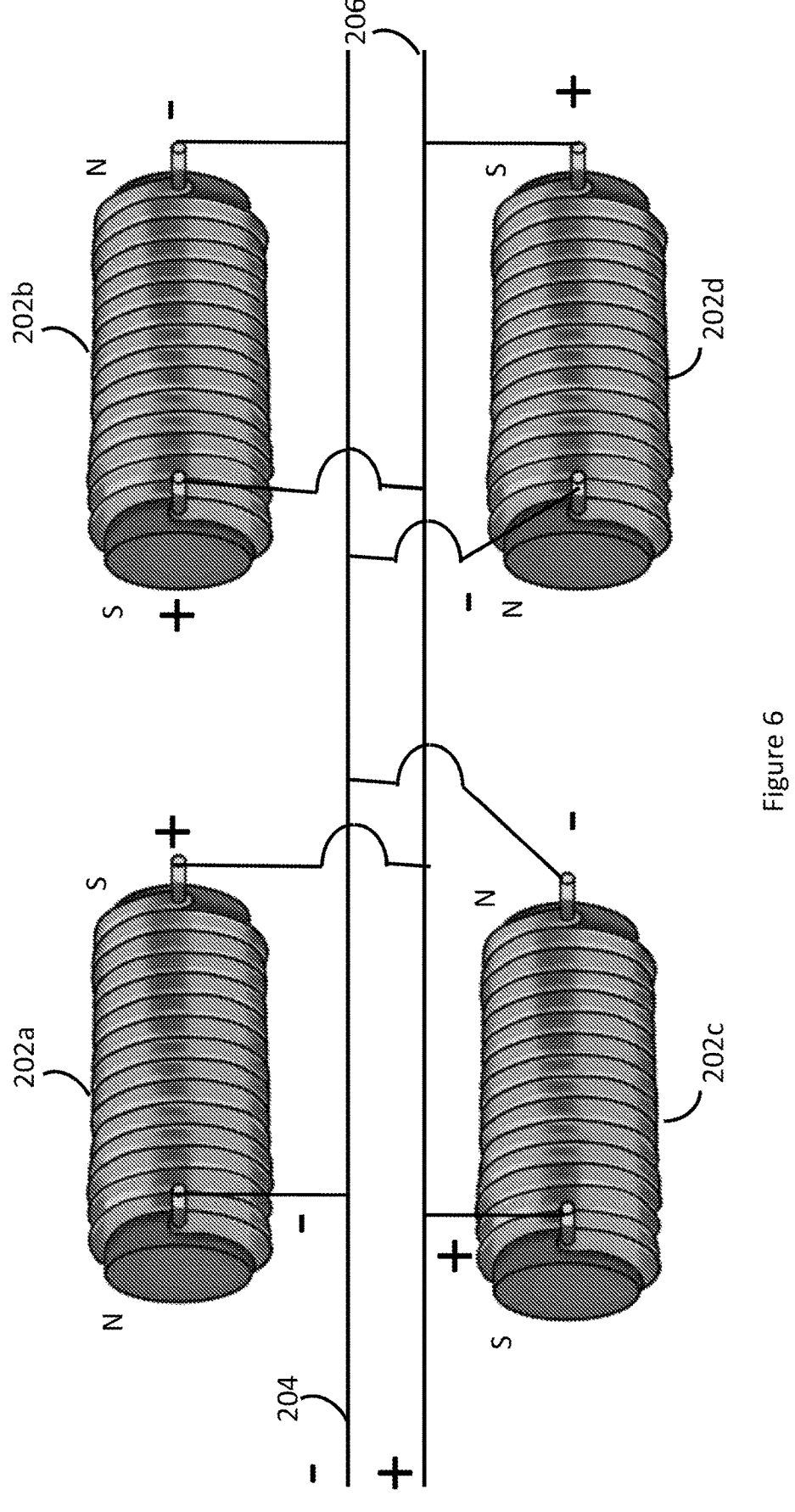
FIG. 6 shows an example roadway magnetic field generator wiring diagram.

FIG. 6 shows an example connection of example magnetic or electromagnetic field generators 202 that are embedded within the roadway 10 structures of FIGS. 5A-5D. Each magnetic or electromagnetic field generator 202 may comprise an iron or other magnetic or other core around which is wound any number of conductive windings in one layer of windings, two layers of windings, three layers of windings, or more layers of windings. The magnetic or electromagnetic field generators 202 may be connected to electrical power rails 204, 206 of different polarities. Such different polarities can be ground and some positive DC voltage such as 6 volts, 12 volts, 18 volts, 20 volts, 50 volts, 100 volts, 200 volts or other voltage for a static DC current, different sides of a single or multiphase sinusoidal or other waveform AC current generator, different connections of a radio frequency or other electromagnetic current generator at any frequency or wavelength including power frequencies, high frequencies, very high frequencies, ultra high frequencies, etc., or any combination of the above.

For example, in some cases, the magnetic or electromagnetic field generators are designed to operate as resonant tank circuits (e.g., with the addition of appropriate capacitance) and coils or pickups on vehicle 10 are similarly designed to operate as resonant tank circuits, with the resonant frequency(ies) of the roadway generators 202 being the same fundamental frequency as the fundamental resonant frequency of the vehicle coils/pickups 102 and/or a harmonic thereof such as a second harmonic or a third harmonic or a fourth harmonic or any other harmonic. In other examples, induction instead of and/or in addition to resonance is relied upon to transfer energy from the roadway coils 202 to the vehicle coils 102. In some systems, both DC and AC signals are provided on the power rails 204, 206 simultaneously or in seriatim.

Figure 4B:
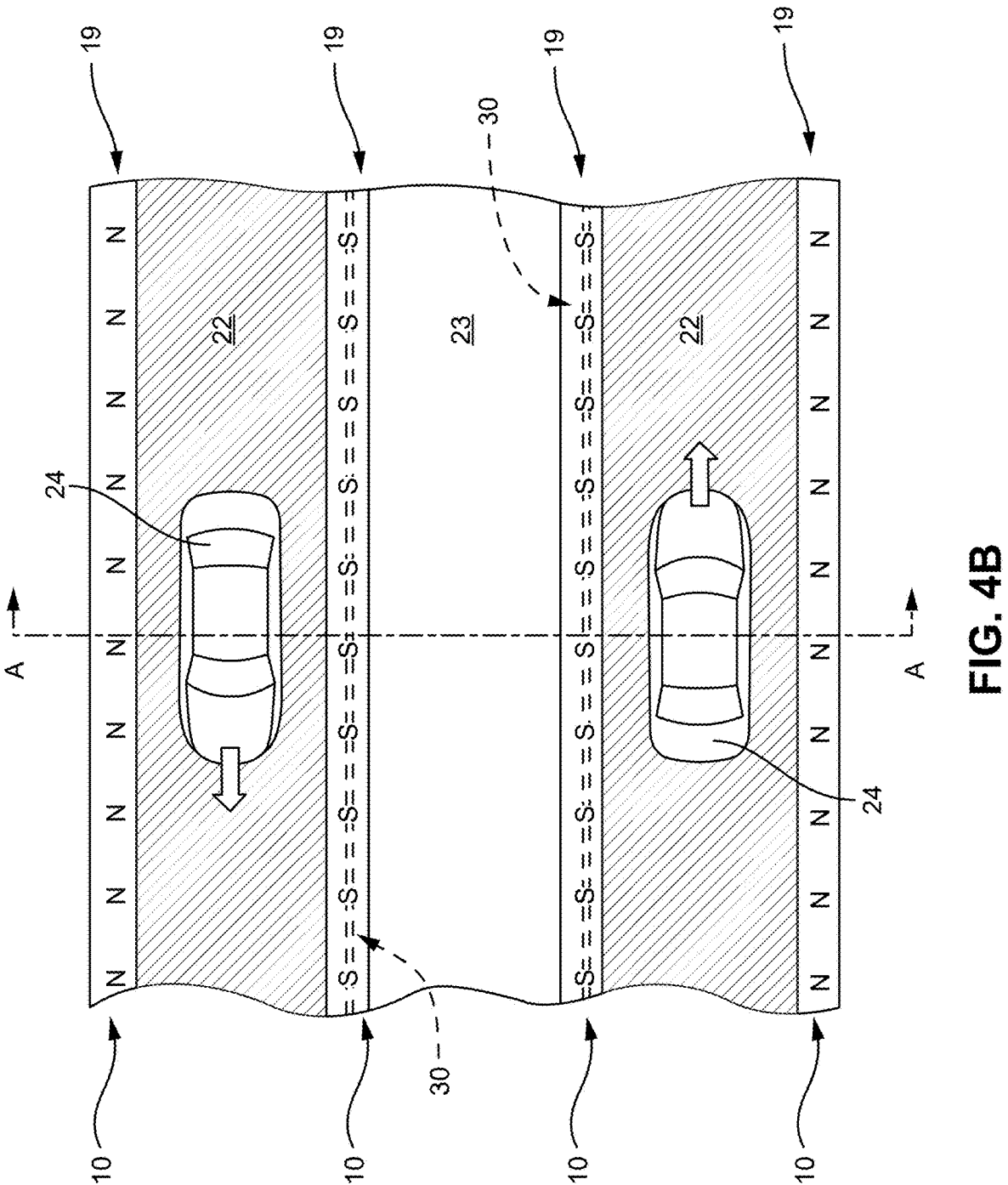
Figure 4C:
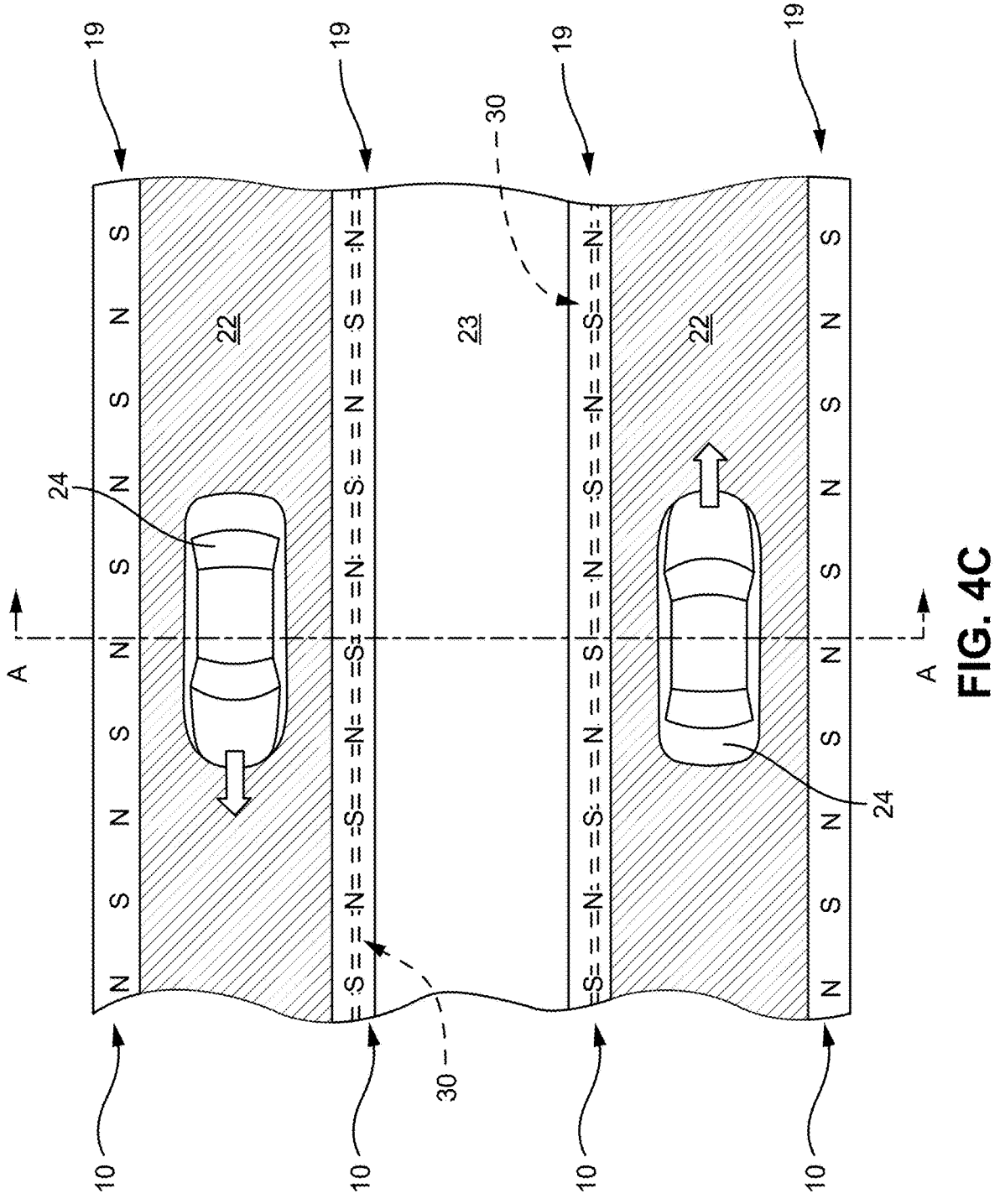

In the example shown, the magnetic or electromagnetic field generators 202 are connected in parallel to the power rails 204, 206 but in other examples they may be connected in series or some may be connected in series and parallel. In the example, shown in FIGS. 4A, 4C and 6, these magnetic or electromagnet field generators 202 are connected to the power rails 204, 206 such that magnetic N poles on one side of the roadway lane are opposite magnetic S poles on the other side of the roadway lane, and in the roadway axial direction the poles alternate N-S-N-S, etc. Such alternating poles are achieved by reversing the electrical connections for every other field generator 202 in the axial direction. In the FIG. 4B embodiment, one side of the carriageway or lane has all N poles, and the other side has all S poles. Which configurations are used may be determined in part by the spacing between the embedded magnetic or electromagnetic field generators, the frequency(ies) at which they operate (if they produce dynamic or static fields), and/or other factors.

In one embodiment, the northern magnetic polarity jumps across the field to the southern magnetic polarity opposite to it and have its northern magnetic polarity jump across the field to the southern magnetic polarity on the opposite rail or side. In one embodiment it is undesirable to have the two fields generated by the two rails or sides cross, so the embodiment emanates a single continuous loop—which might also suggest that the strength of the one rail may need to be stronger than, weaker than or the same magnetic strength as the opposite side.

If electromagnets are used with AC current, the poles will be constantly changing. Thus, the poles shown in FIGS. 4B, 4C might be a snapshot of an instant in time, but the poles will change with varying polarity of the excitation current. For example, the left electromagnet may be fed 180 degrees out of phase relative to the right electromagnet so the poles of the two electromagnets are always exactly opposite to one another. Given the distance between the left and right electromagnets, a sufficiently high current is fed to the generators 202 to produce "effective" magnetic flux between the generators. Depending on the frequency, the field generators may generate both electric and magnetic fields but the electric field is localized and should have no impact on our system. In other examples, the field generators 202 may emanate electromagnetic radiation such as radio frequency signals having both an electric field and a magnetic field e.g., at right angles to one another.

Electromagnets can generate either a static or variable magnetic field, depending on whether they are powered by DC or AC current. As to the use of the electromagnets, they can potentially produce a stronger pulsed or varied field than permanent magnets depending on the type of permanent magnetics. A steady-state field may be created by the use of a permanent magnet system. In some embodiments, there may be a difference between such set ups for the wireless connection; and for the ability for the field to create a loop between the two rails or sides regardless of whether the rails or sides are electromagnet or permanent magnets.

Example Terms:

Permanent Magnet: a magnet that retains at least some magnetic properties in the absence of an inducing field or current. An example is a common bar magnet or a compass needle.

Electromagnet: a device that generates a magnetic field when an electric current is applied. An example is a soft iron core around which is wrapped an insulated wire or other conductor, or a solenoid used in an electrically controlled valve.

Electromagnetic field: a field of force that consists of both electric and magnetic components. An example is a radio wave.

For further information, see e.g., Purcell et al, Electricity and Magnetism (Cambridge University Press 3d Ed, 2013); Coey, Magnetism and Magnetic Materials (Cambridge University Press 2010); Staelin, Electromagnetics and Applications, MIT Course Number6.013 (Spring 2009), https://ocw.mit.edu/courses/electrical-engineering-and-computer-science/6-013-electromagnetics-and-applications-spring-2009/; Wangsness, "Electromagnetic Fields" (Wiley 2d Ed. 2007).

Example Simulation Results

The following simulations were conducted to study the generation of magnetic fields across a charging lane on a highway, and also to determine the strength of magnetic field output.

The simulations presented herein are comprised of different models and geometries (cylindrical and square) of permanent magnets and electromagnets.

Permanent Magnets

Figure 7:
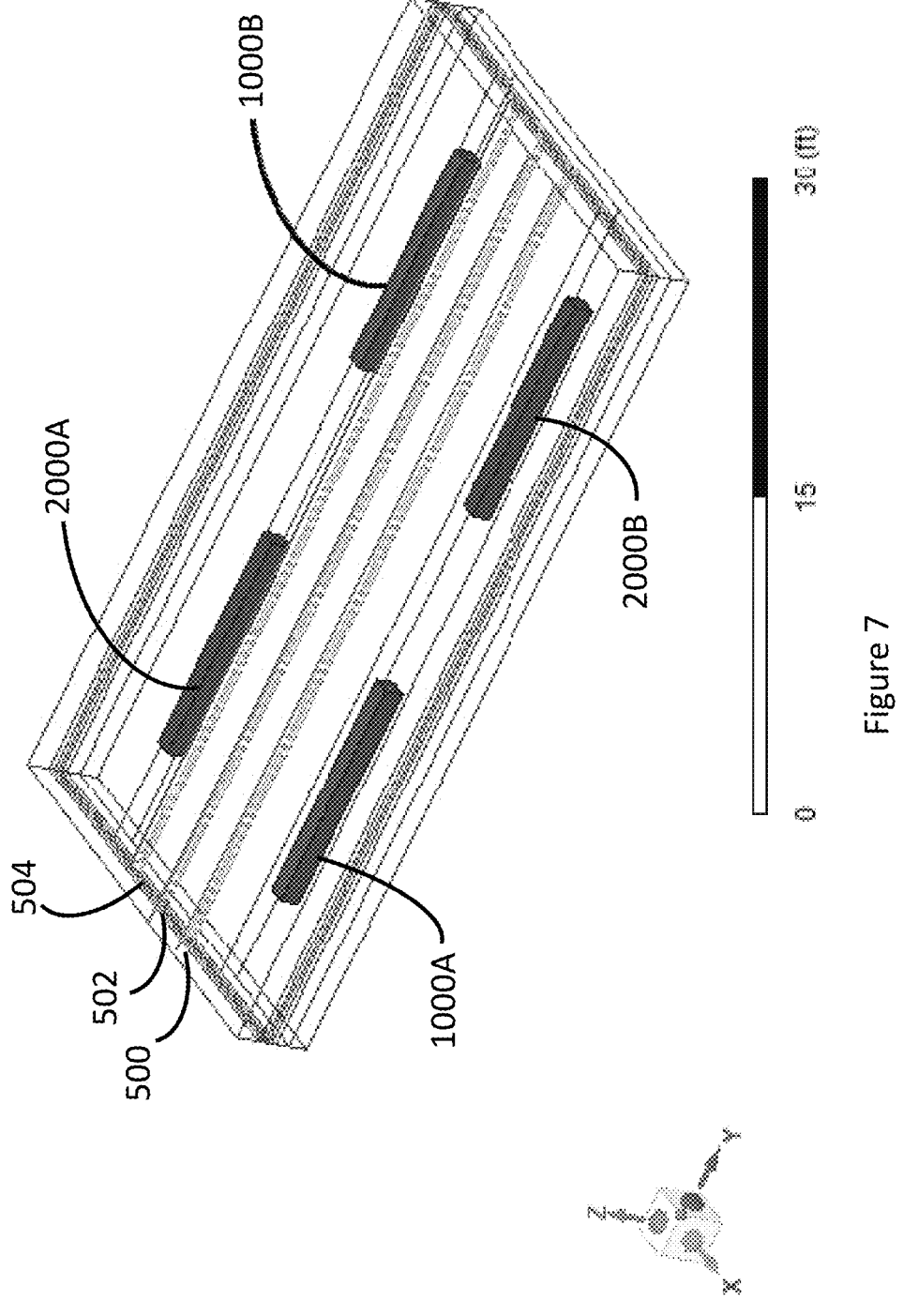
FIG. 7 shows an Alnico Permanent magnet model.
Figure 8:
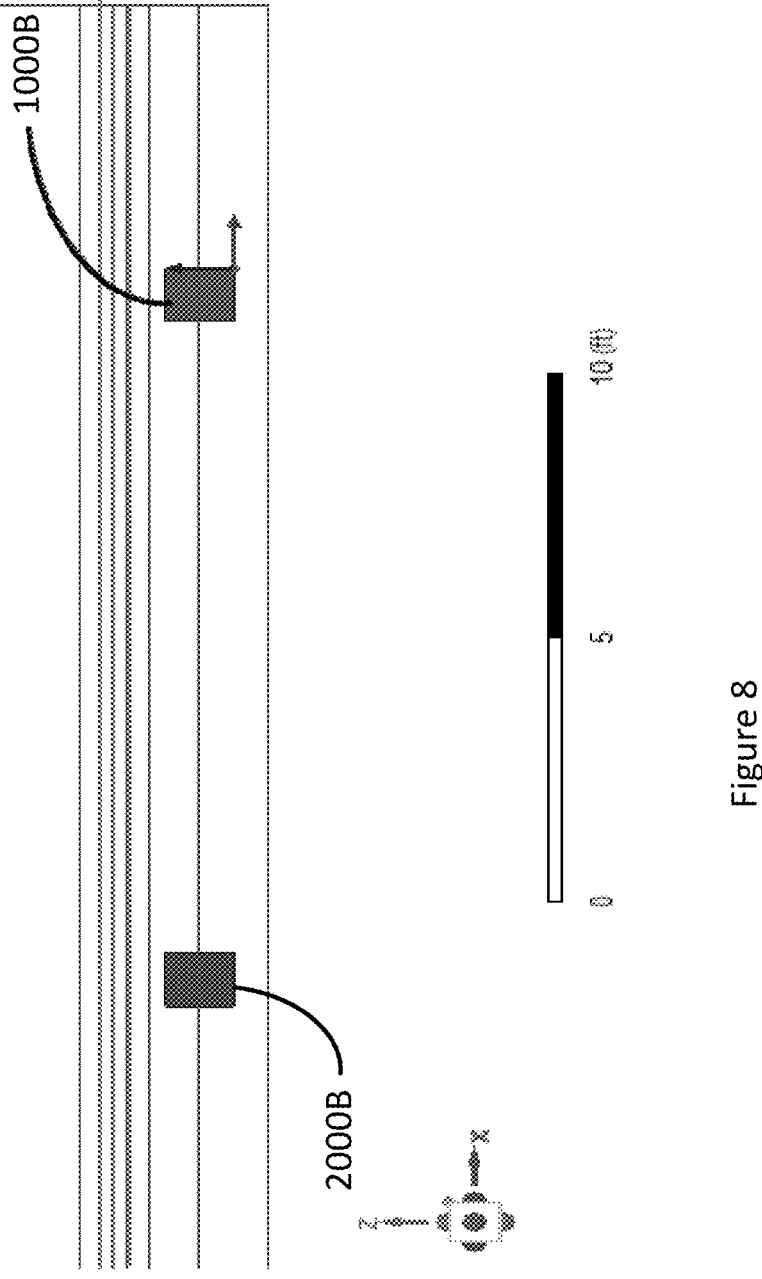
FIG. 8 is a side view of an Alnico permanent magnet model.

A model shown in FIGS. 7 & 8 consists of 4 permanent magnets 1000A, 1000B, 2000A, 2000B (material: Alnico 5). The effective magnetization of the magnets 2000A, 2000B is oriented to the positive y-direction, while for the magnets 1000A, 1000B lies in the negative direction. The magnets dimensions are 1×1×12 ft.

Figure 9:
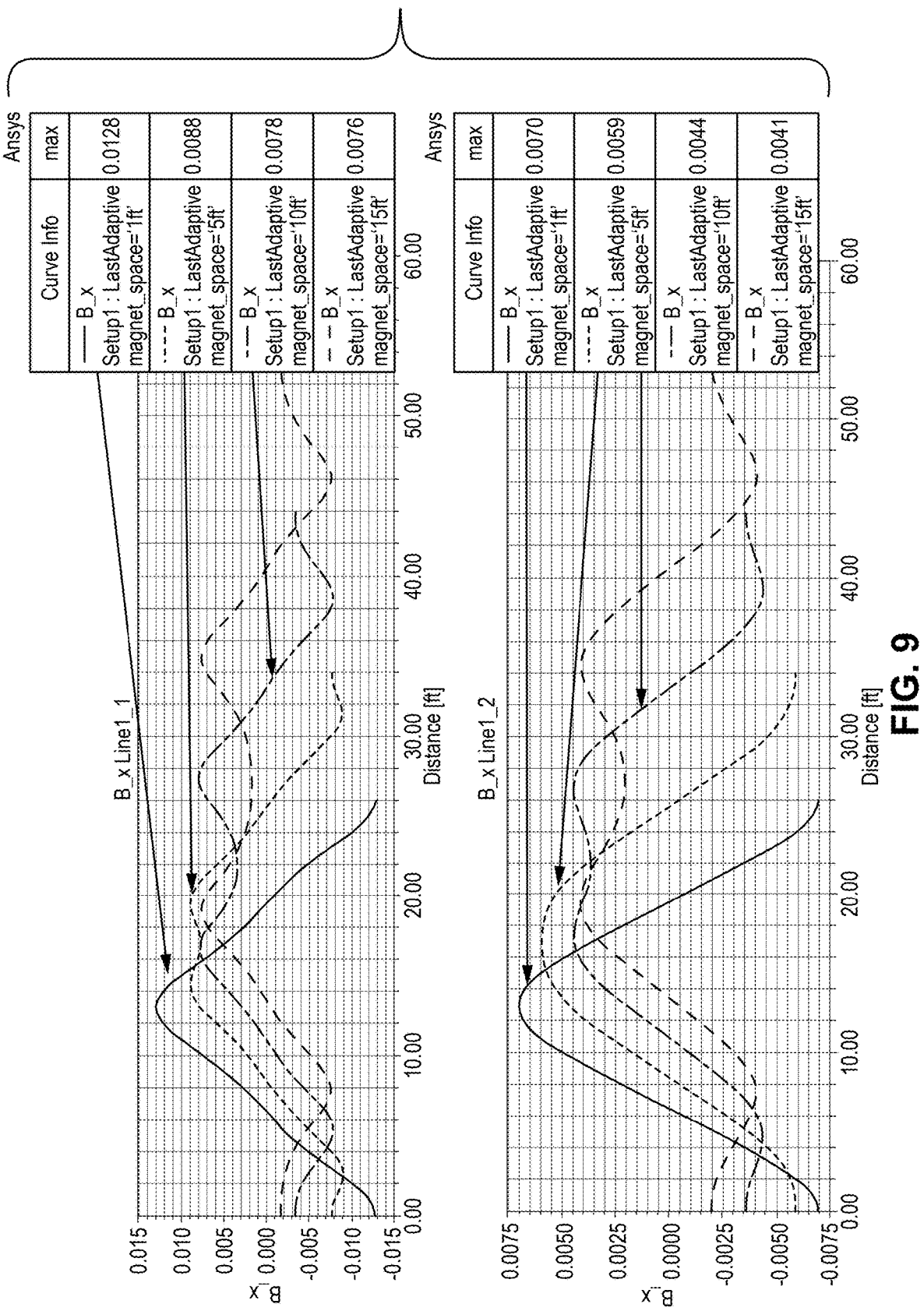
FIG. 9 show example results for Line 1_1 (closest to the permanent magnets) and Line 1_2 (middle of the road).

For this configuration a rail space of 12 ft was considered, varying the space between magnets on the same side by 1, 5, 10 & 15 ft. The results of these simulations were considered at a different height from the magnets (6.5, 8.9 & 11.5 inches, magenta lines FIG. 8). Simulation results for this model are showed in FIG. 9; the maximum value obtained is of $B_t\sim 0.0128$ for lines 1 and 3 at 6.5 inches height from the magnets.

Cylindrical Coils

Figure 10:
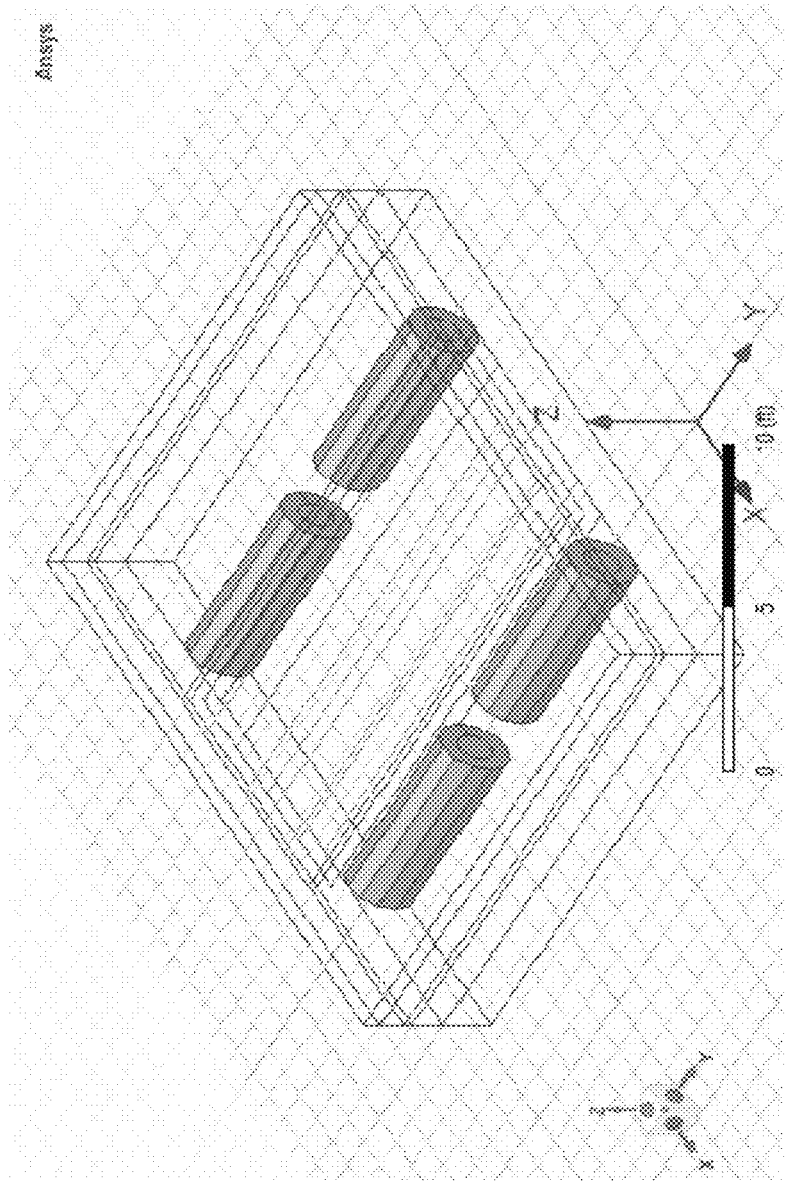
FIG. 10 shows an example Copper-Steel 1008 Cylindrical Coils model.
Figure 11:
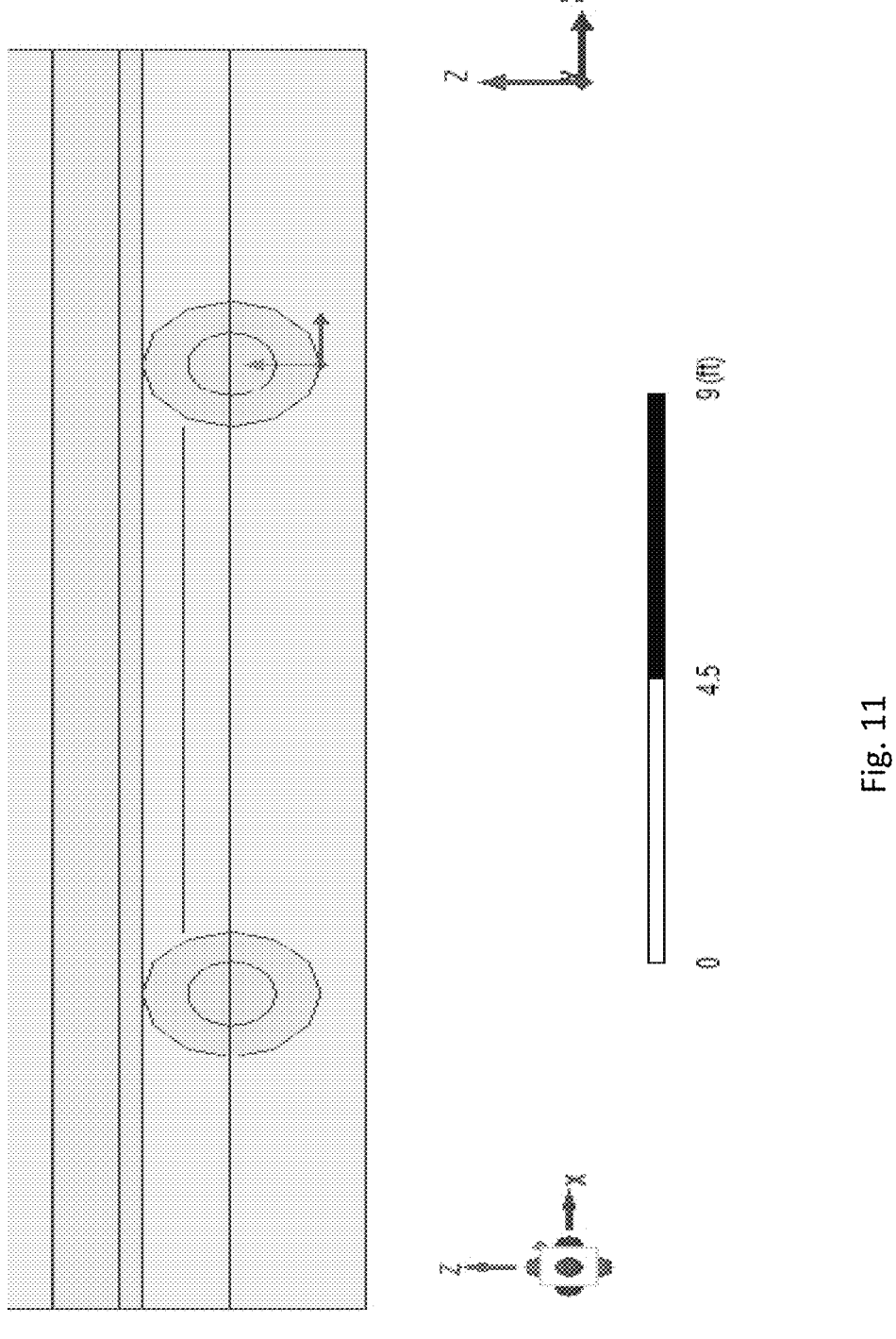
FIG. 11 shows a side view of an example Copper-Steel 1008 Cylindrical Coils model.

FIGS. 10 & 11 show another configuration; instead of permanent magnets this model considers four electromagnets of 6 ft length oriented parallel to the y-direction, with a core of 0.5 ft radius and windings with an external radius of 1 ft. The material employed for the core was Steel 1008 and copper for the windings.

Figure 12A:
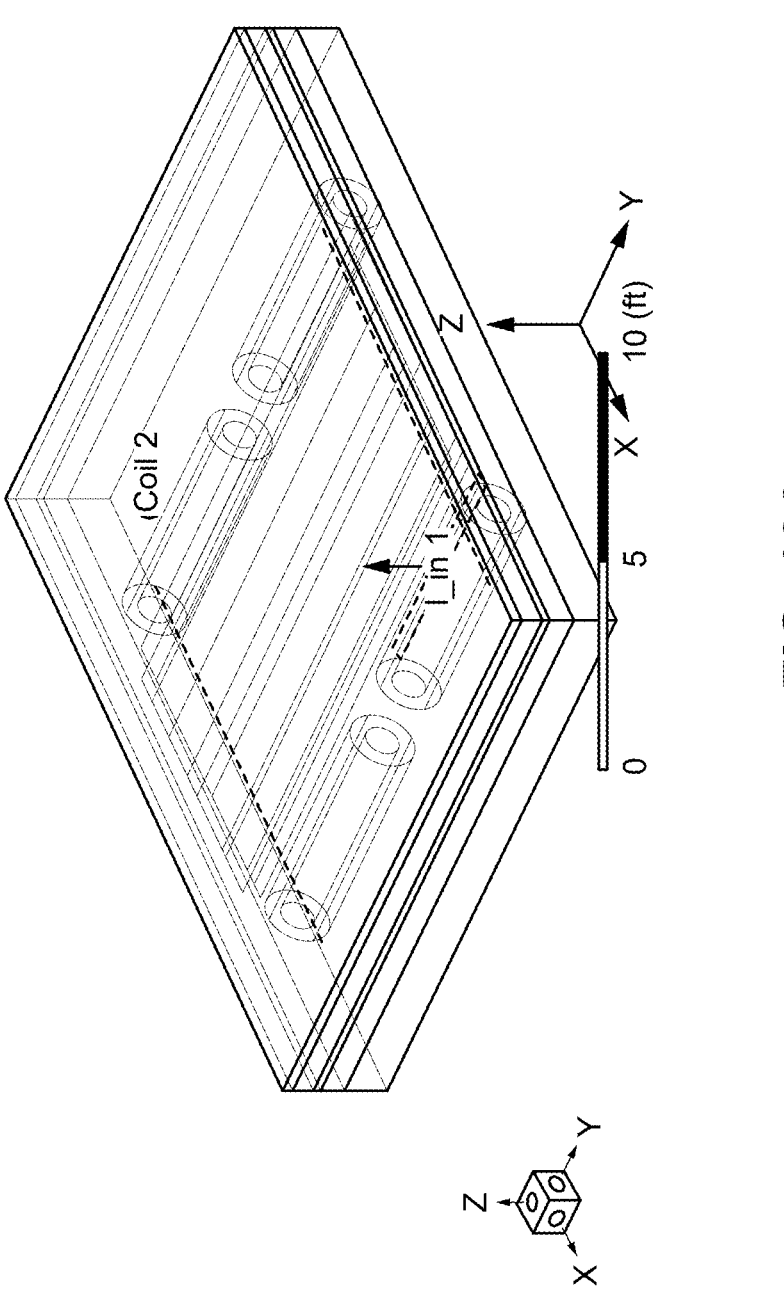
FIG. 12A shows example excitation current on coil 1 and 2 of the FIG. 10, 11 model. Then the induced magnetic field is oriented +y.
Figure 12B:
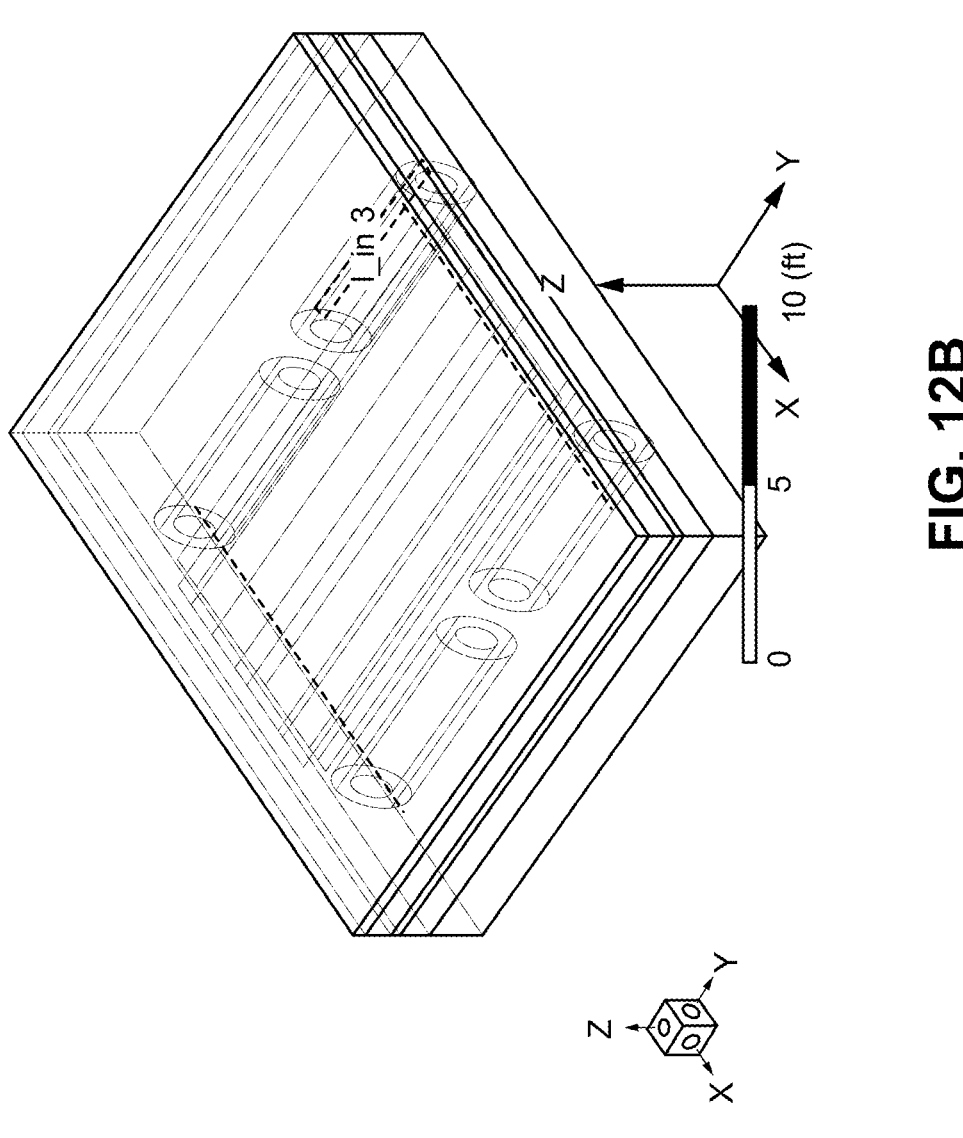
FIG. 12B shows example excitation current on coil 3 and 4 of the FIG. 10, 11 model.

The coils are excited by an external current. As shown in FIGS. 12A &12B, the direction of the applied current is the same for coils 1 and 2 and opposite for coils 3 and 4.

Similar than in the previous model, the simulations performed consist in varying the space between magnets in the same side as 2, 5, 10 & 15 ft. Considering an excitation current of 100 kA, the simulation results of FIGS. 13A, 13B show a maximum value of $B_t\sim 0.0151$ at the ground level of the structure.

Figure 13A:
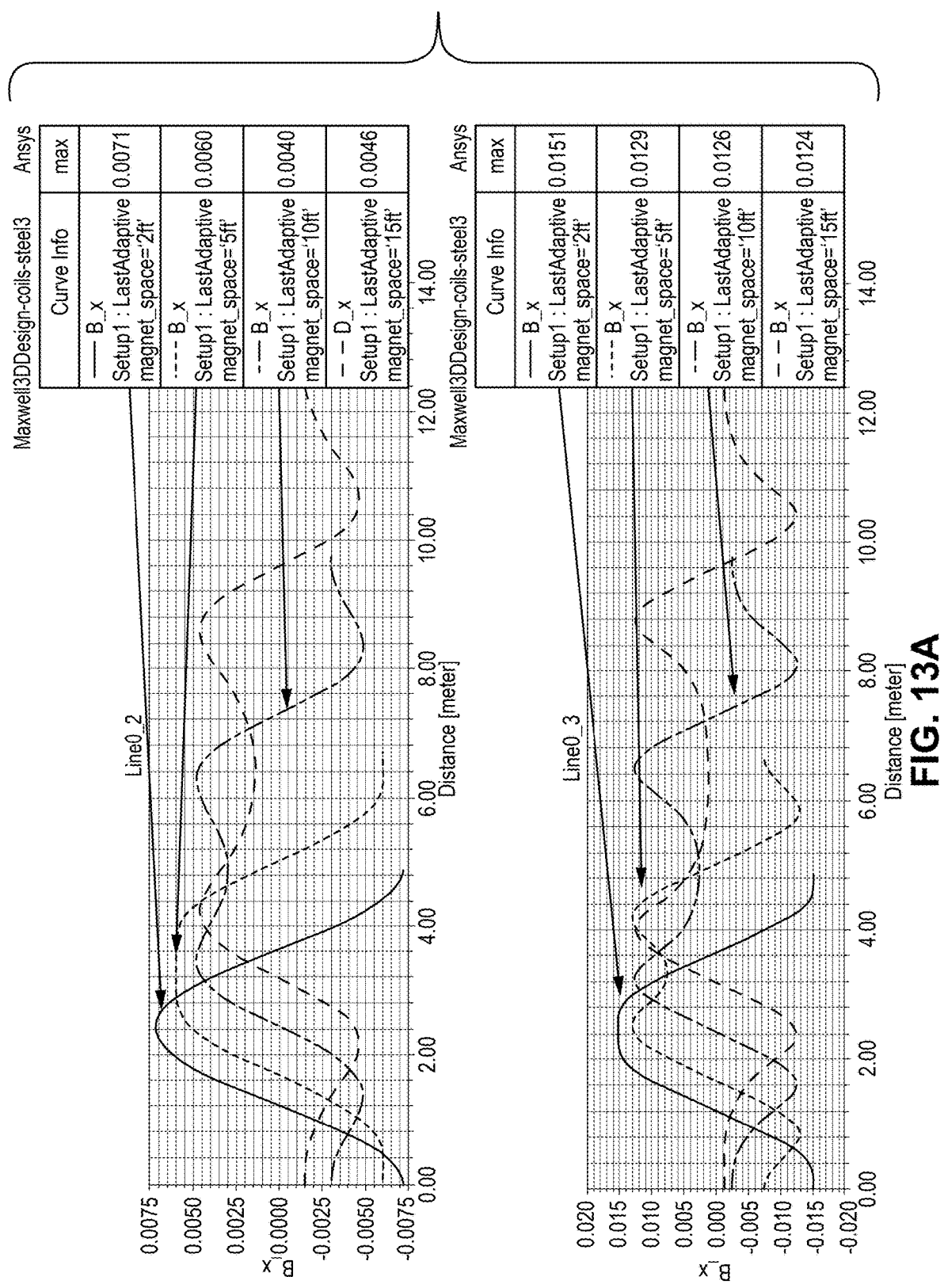
FIG. 13A shows example magnetic field strength $B_x$ along lines 0_2 and 0_3.
Figure 13B:
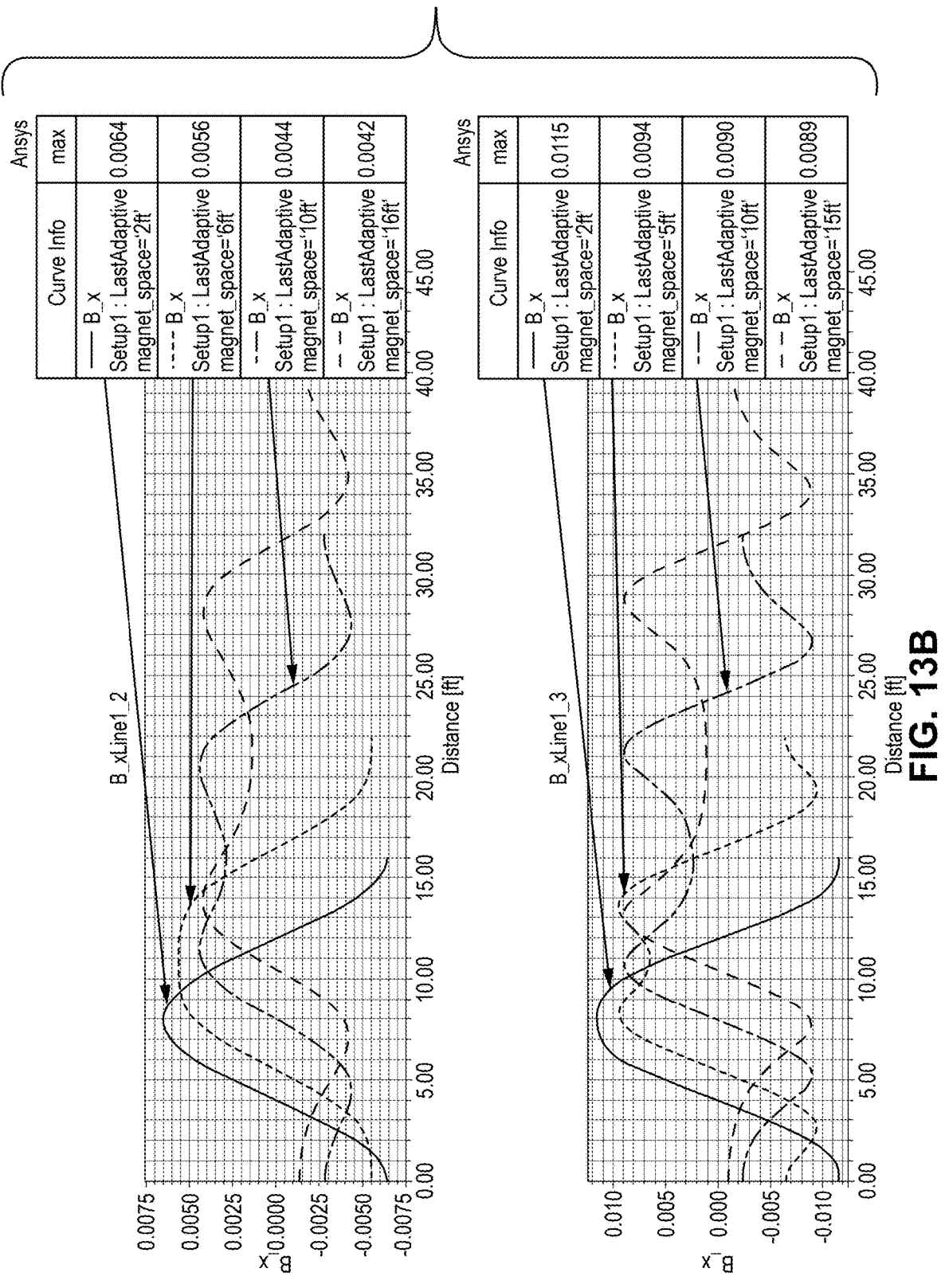
FIG. 13B shows example magnetic field strength $B_x$ along lines 1_2 and 1_3. Line 1 is located at 0.25 ft above the coils.
Figure 14:
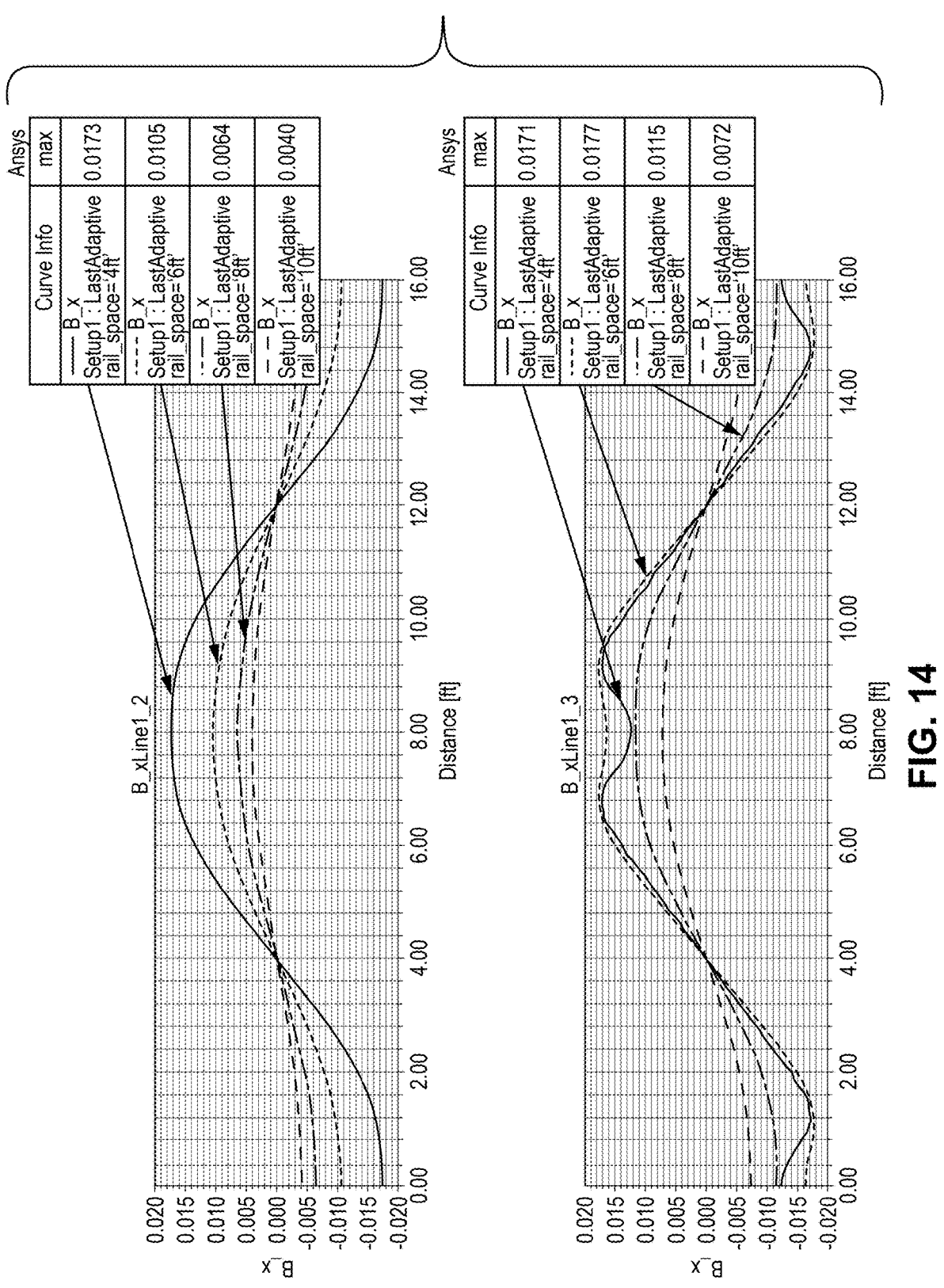
FIG. 14 shows example magnetic field strength $B_x$ along lines 1_2 and 1_3 considering different values for rail spacing.

The maximum value of the magnetic field in FIG. 13A, 13B is with a magnet spacing of 2 ft. Thus, another consideration in this model was to keep the magnet space constant at 2 ft and to vary the width of the rail spacing from 4, 6, 8 and 10 ft. The results are presented in FIG. 14.

Square Coils

Figure 15:
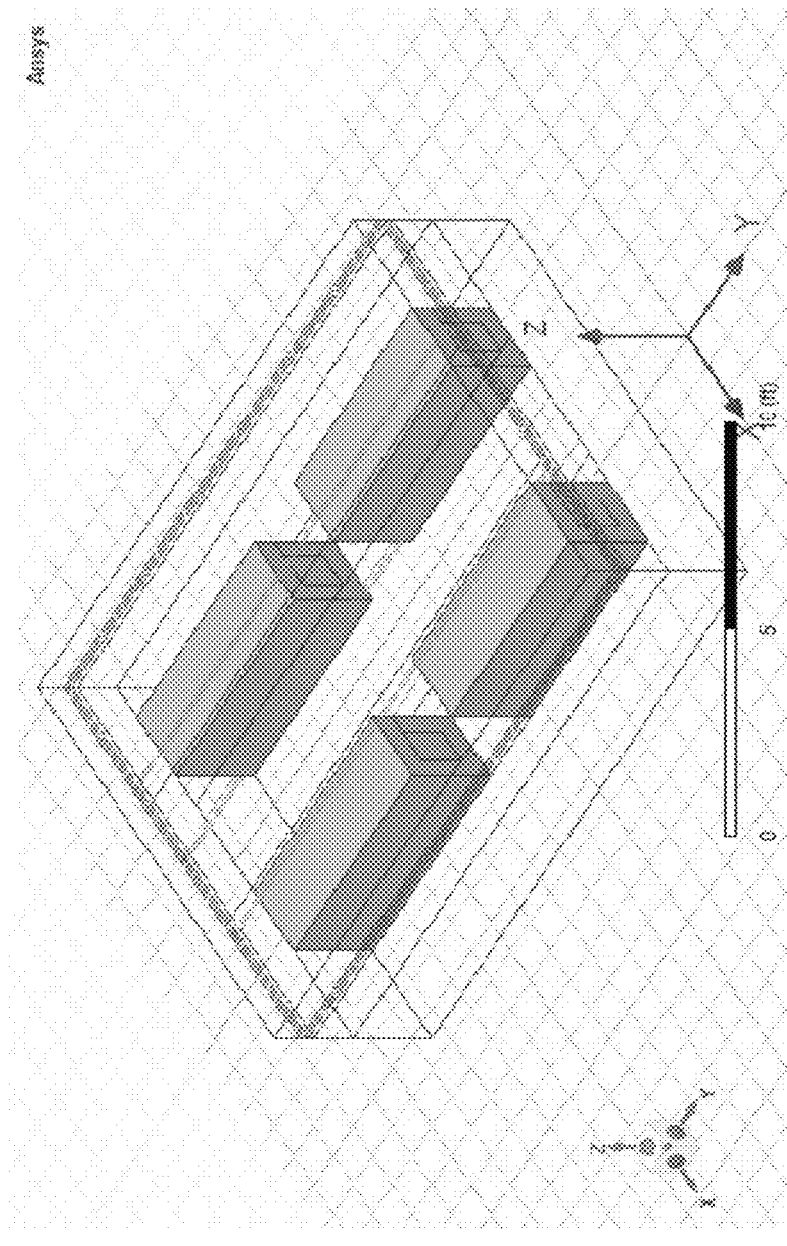
FIG. 15 shows an example square coils configuration.
Figure 16:
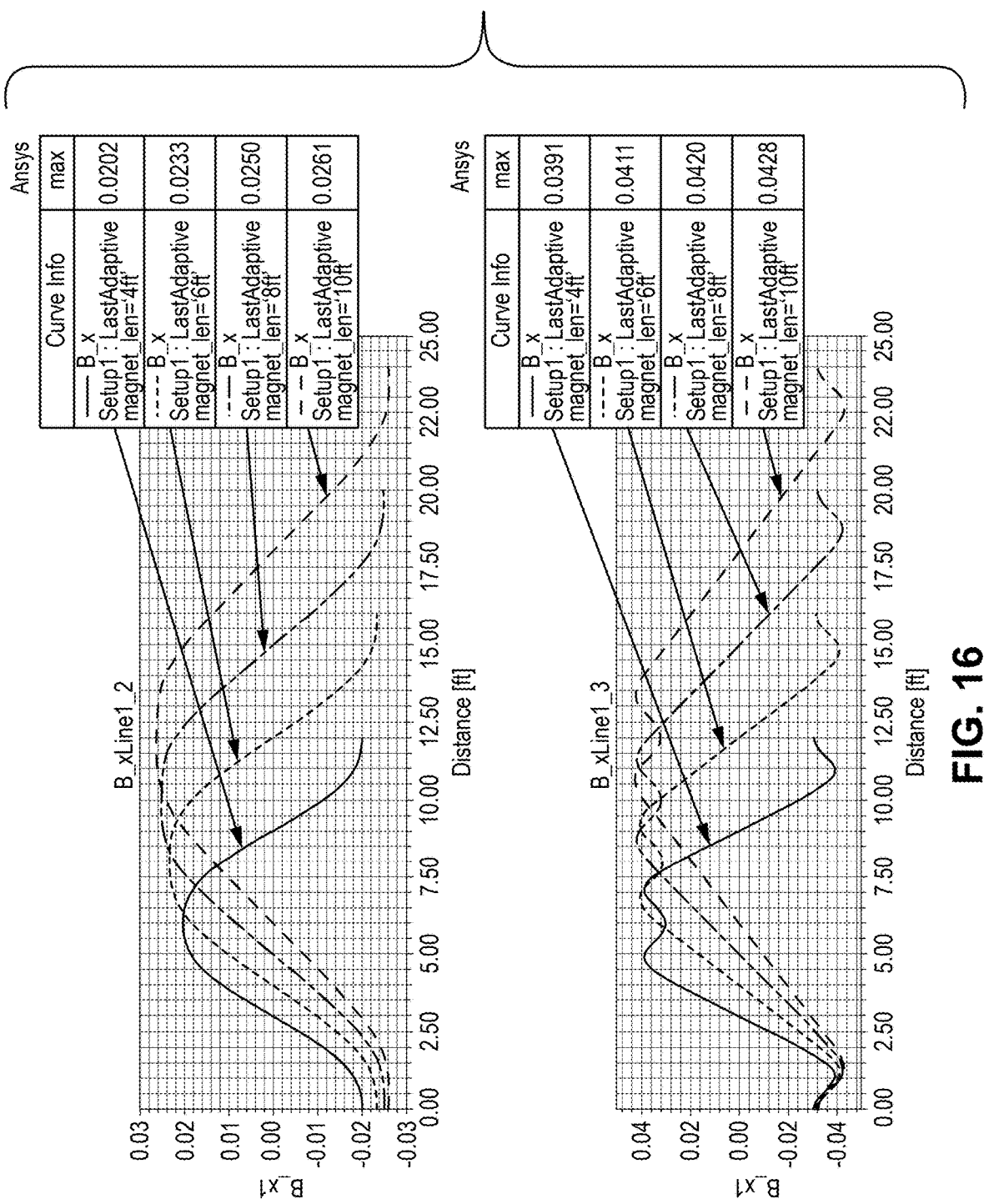
FIG. 16 shows an example result of the square coils model considering different length for the electromagnets.
Figure 17:
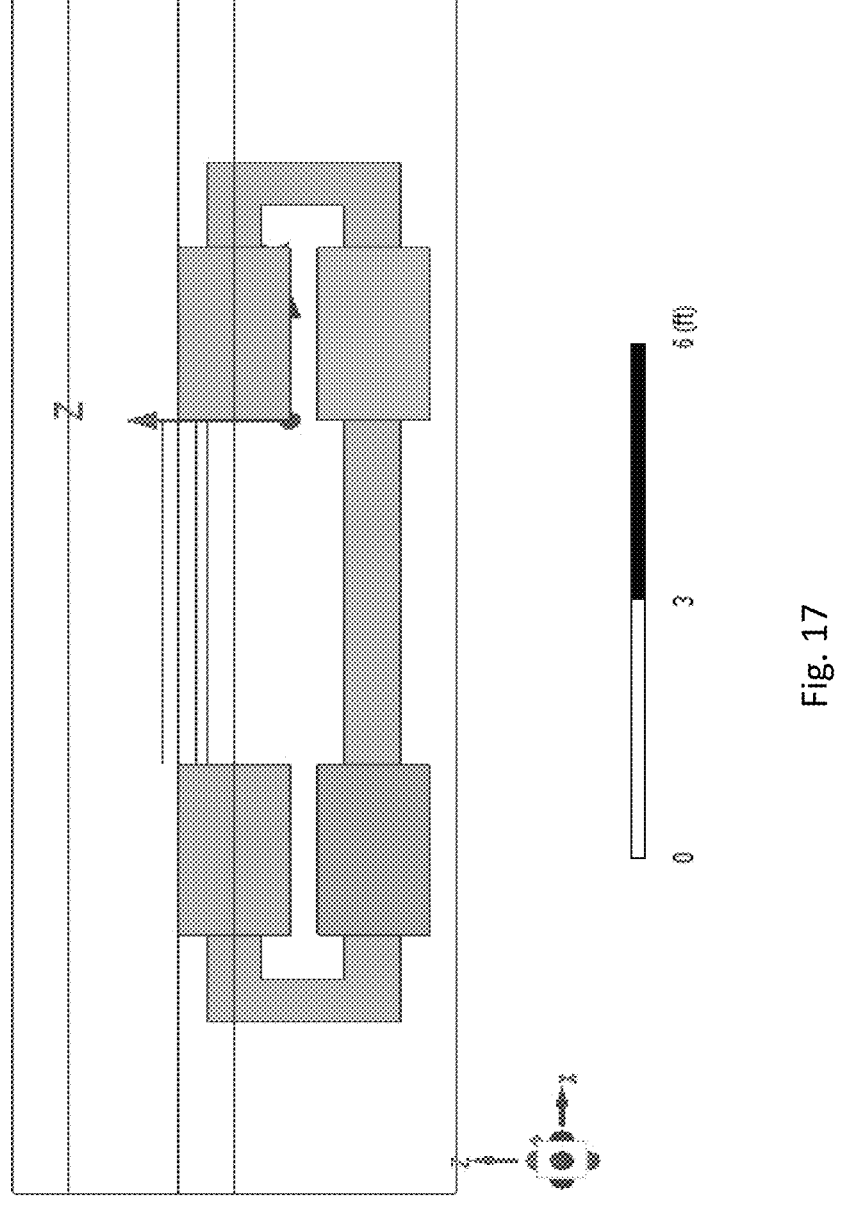
FIG. 17 shows a side view of an example double square coils configuration.

The first configuration using square coils shown in FIG. 15 consists of four electromagnets of 6 ft length oriented parallel to the y-direction, with a core of 0.5×0.5 ft and windings with an external winding of 1×1 ft. FIG. 17 shows example simulation result of the square coils model considering different length for the electromagnets.

Double Square Coils

Figure 18:
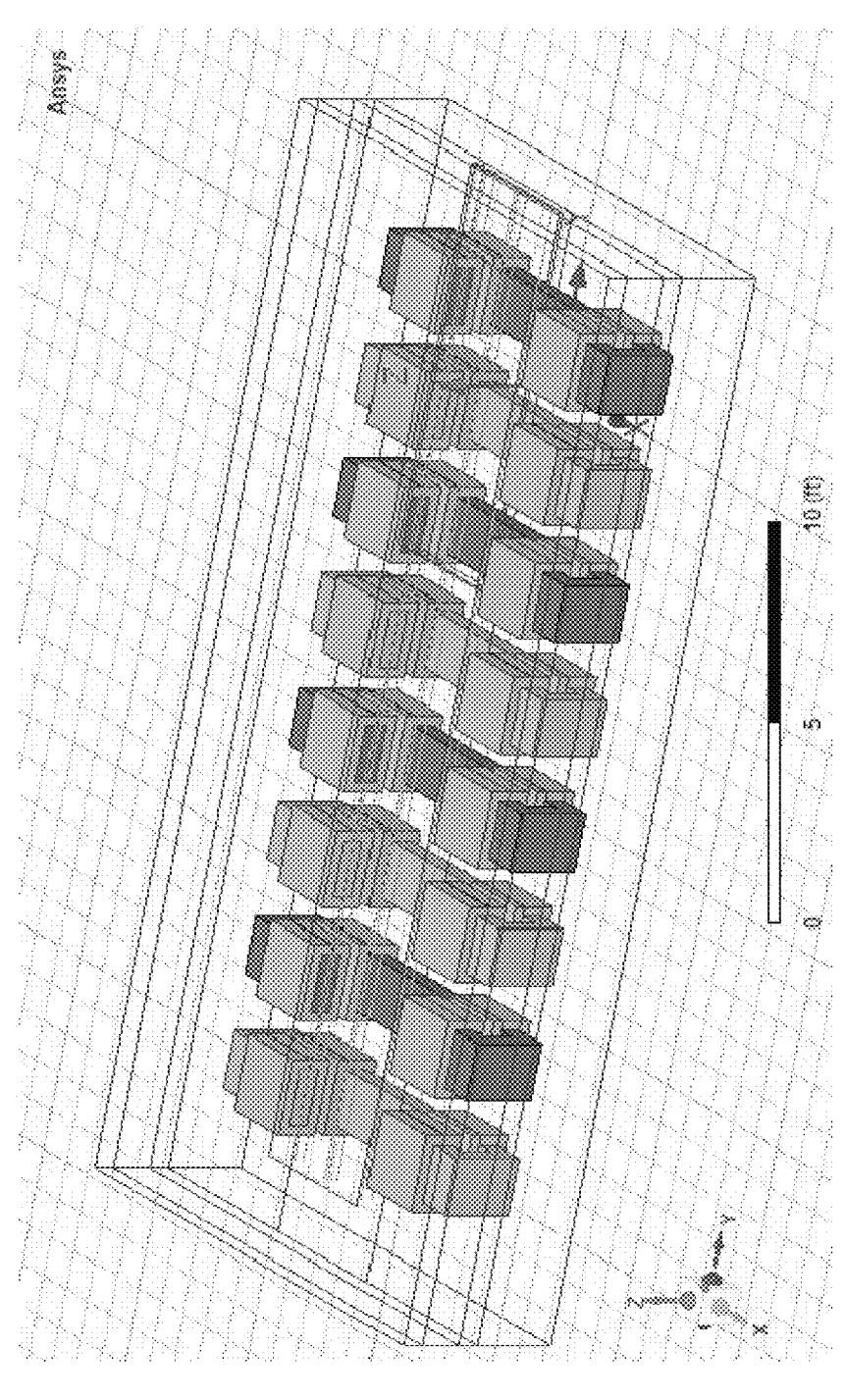
FIG. 18 shows an example perspective view of the FIG. 17 double square coils configuration.

The double square coils shown in FIGS. 17 & 18 consist of 2 copper coils of 2×1×1 ft and a core of Steel 1008 that pass through the coils in the other side of the road as well.

For this simulation, 8 sets of the double square coils were used, separated 2 ft apart and the excitation current to each coil was 100 kA. The direction of this current lies on −z direction for the upper coils and +z for the ones at the bottom.

Figure 19:
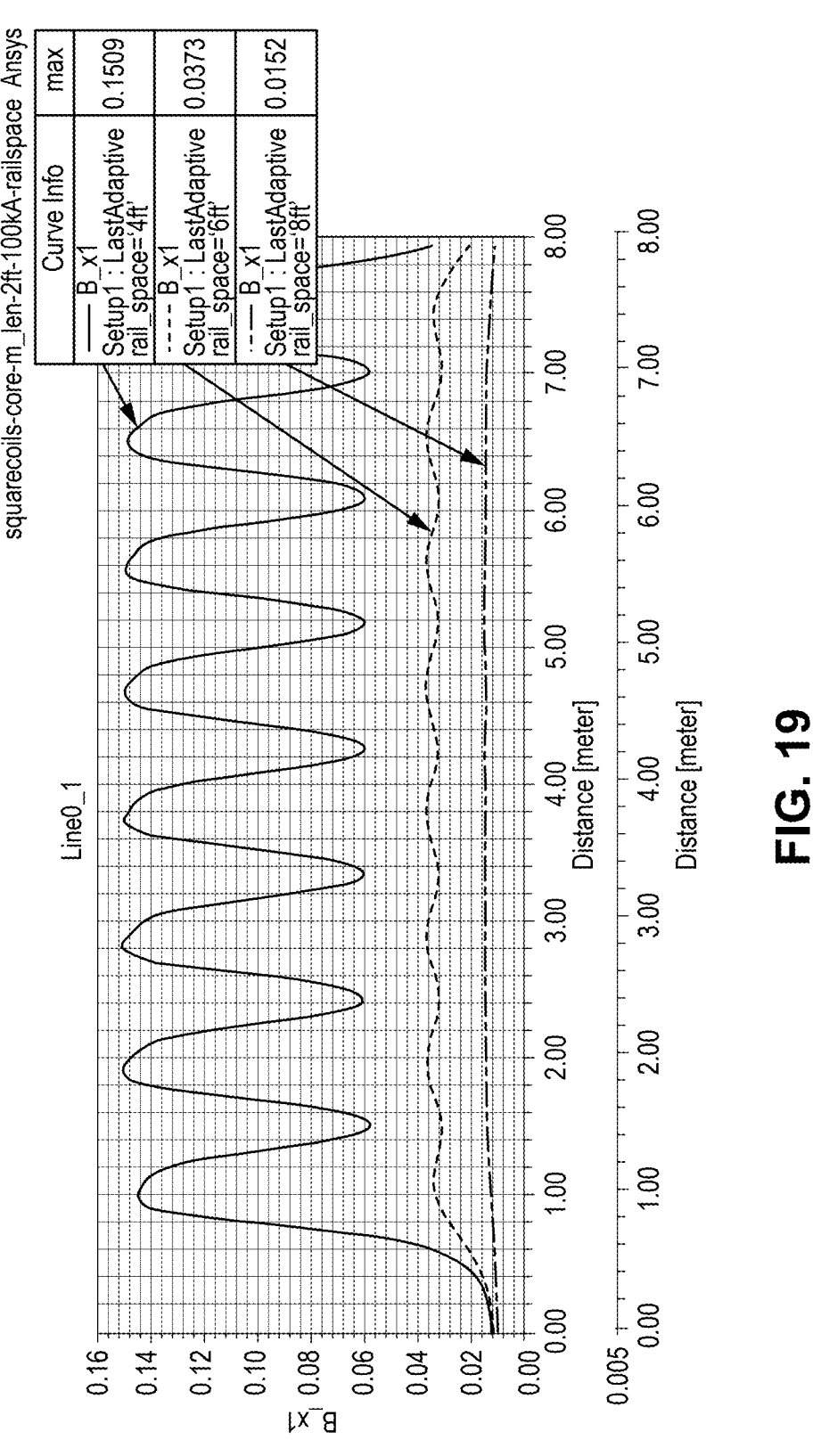
FIG. 19 shows simulation results for the double square coils configuration.

Similar than in the previous cases, the simulation of FIG. 19 for the double square coils considered a rail space of 4, 6 and 10 ft.

All patents, patent applications and publications cited herein are incorporated by reference for all purposes as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A charging roadway for wirelessly charging vehicles as they move along a carriageway or lane longitudinal path, the carriageway or lane having a transverse extent between a first side of the carriageway or lane and a second side of the carriageway or lane opposite the first side, the transverse extent being sufficiently wide to accommodate the vehicles as they travel along the longitudinal path, the charging roadway comprising:

a first array of electromagnets disposed on or in the first side of the carriageway or lane, the first array of electromagnets providing a first series of magnetic poles; and a second array of electromagnets disposed on or in the second side of the carriageway or lane opposite the first side and spaced apart from the first array of electromagnets with the longitudinal path between the first array of electromagnets and the second array of electromagnets, the second array of electromagnets providing a second series of magnetic poles, the first array of electromagnets and the second array of electromagnets configured to cooperatively produce charging magnetic fields spanning between the first series of magnetic poles and the second series of magnetic poles, without requiring registry of magnetic field pickup elements on vehicles moving along the roadway with either the first array of electromagnets or the second array of electromagnets for wireless charging.

2. The charging roadway of claim 1 further including ferromagnetic material disposed within a top paving course of the charging roadway in a spacing between the first side of the carriageway or lane and the second side of the carriageway or lane, the ferromagnetic material being configured to increase magnetic flux of the charging magnetic fields.

3. The charging roadway of claim 1 further including first structure focusing the charging magnetic fields to span across the carriageway or lane transverse extend from the first side of the carriageway or lane to the second side of the carriageway or lane.

4. The charging roadway of claim 1 further including a first power rail disposed within the roadway and connected to supply electric current to the first array of electromagnets, and a second power rail disposed within the roadway and connected to supply electric current to the second array of electromagnets.

5. The charging roadway of claim 4 wherein the electric current comprises direct current.

6. The charging roadway of claim 4 wherein the electric current comprises alternating current.

7. The charging roadway of claim 1 wherein the second series of magnetic poles have a polarity that opposes a polarity of the first series of magnetic poles.

8. The charging roadway of claim 1 wherein the second series of magnetic poles have polarities that oppose polarities of the first series of magnetic poles.

9. A charging roadway including a carriageway or lane disposed on a top surface course, the carriageway or lane providing a path for longitudinal vehicle travel down the roadway, the charging roadway comprising:

a first electromagnet disposed in or on the top surface course on a first side of the carriageway or lane, a second electromagnet disposed in or on the top surface course on a second side of the carriageway or lane opposite the first side, the path being defined between the first side and the second side, the first electromagnet and the second electromagnet cooperating to produce a charging magnetic field spanning the path from the first side of the carriageway or lane to the second side of the carriageway or lane; and ferromagnetic particles disposed within the top surface course between the first side of the carriageway or lane and the second side of the carriageway or lane, the ferromagnetic particles providing a magnetic characteristic that causes or encourages the charging magnetic field to span the path between the first side of the carriageway or lane and the second side of the carriageway or lane so that neither the first electromagnet nor the second electromagnet are disposed underneath vehicles traveling down the roadway.

10. The charging roadway of claim 9 wherein the charging magnetic field is static.

11. The charging roadway of claim 9 wherein the charging magnetic field is dynamic.

12. The charging roadway of claim 9 wherein the first electromagnet comprises a first pair of conductive coils, the second electromagnetic comprises a second pair of conductive coils, and the roadway further comprises a steel core passing across the carriageway or lane through both the first electromagnet and the second electromagnet.

13. The charging roadway of claim 9 wherein spacing between the first electromagnet and the second electromagnet is at least 10 feet.

14. The charging roadway of claim 9 wherein the first electromagnet and the second electromagnet are each cylindrical.

15. The charging roadway of claim 9 wherein the first electromagnet and the second electromagnet are each rectangular.

16. The charging roadway of claim 9 wherein further comprising:

a third electromagnet spaced from the first electromagnet in the longitudinal direction, the third electromagnet disposed on the first side of the carriageway or lane, and a fourth electromagnet spaced from the second electromagnet in the longitudinal direction, the fourth electromagnet disposed on the second side of the carriageway or lane, the third and fourth electromagnets configured to cooperate to produce a further charging magnetic field spanning across the carriageway or lane, the third and fourth electromagnets configuring the further charging magnetic field to wirelessly charge a charging vehicle as the charging vehicle moves along the roadway in the longitudinal direction through the further charging magnetic field.

17. The charging roadway of claim 16 wherein the third electromagnet is spaced more than two feet and less than 15 feet from the first electromagnet, and the fourth electromagnet is spaced more than two feet and less than 15 feet from the second electromagnet.

18. A charging roadway for wirelessly charging vehicles as they move along a longitudinal path on the charging roadway, the charging roadway having a transverse extent that is sufficiently wide to accommodate the charging vehicles as they move along the longitudinal path, the charging roadway comprising:

a first array of electromagnets disposed on or in a first side of the transverse extent, the first array of electromagnets providing a first series of magnetic poles; and a second array of electromagnets disposed on or in a second side of the transverse extent opposite the first side and spaced apart from the first array of electromagnets with the longitudinal path between the first array of electromagnets and the second array of electromagnets, the second array of electromagnets providing a second series of magnetic poles, the first array of electromagnets and the second array of electromagnets configured to cooperatively produce charging magnetic fields spanning across the transverse extent between the first series of magnetic poles and the second series of magnetic poles, without either the first array of electromagnets or the second array of electromagnets being aligned beneath wireless charging magnetic field pickup elements on charging vehicles moving along the longitudinal path.

19. The charging roadway of claim 18 wherein the first series of magnetic poles are North, and the second series of magnetic poles are South.

20. The charging roadway of claim 18 wherein the first series of magnetic poles alternate in polarity and the second series of magnetic poles alternate in polarity.

* * * * *